United States Patent
Fujita

(10) Patent No.: US 9,350,227 B2
(45) Date of Patent: May 24, 2016

(54) POWER CONVERTER CONTROL METHOD

(75) Inventor: Takayuki Fujita, Shiga (JP)

(73) Assignee: DAIKIN INDUSTRIES, LTD., Osaka-Shi (JP)

(*) Notice: Subject to any disclaimer, the term of this patent is extended or adjusted under 35 U.S.C. 154(b) by 277 days.

(21) Appl. No.: 14/347,128

(22) PCT Filed: Sep. 14, 2012

(86) PCT No.: PCT/JP2012/073609
§ 371 (c)(1),
(2), (4) Date: Mar. 25, 2014

(87) PCT Pub. No.: WO2013/047236
PCT Pub. Date: Apr. 4, 2013

(65) Prior Publication Data
US 2014/0233276 A1     Aug. 21, 2014

(30) Foreign Application Priority Data
Sep. 26, 2011   (JP) .................................. 2011-209176

(51) Int. Cl.
*H02M 5/458* (2006.01)
*H02M 1/12* (2006.01)
(Continued)

(52) U.S. Cl.
CPC ........ *H02M 1/12* (2013.01); *H02M 5/22* (2013.01); *H02M 5/297* (2013.01); *H02M 5/4505* (2013.01); *H02M 5/4585* (2013.01)

(58) Field of Classification Search
CPC ...................................................... H02M 5/458
USPC ................................................. 363/34, 37
See application file for complete search history.

(56) References Cited

U.S. PATENT DOCUMENTS

| 7,907,427 B2 | 3/2011 | Sakakibara et al. |
| 7,944,717 B2 * | 5/2011 | Sakakibara ....... H02M 7/53875 363/34 |

(Continued)

FOREIGN PATENT DOCUMENTS

| JP | 2004-222338 A | 8/2004 |
| JP | 2005-27422 A | 1/2005 |

(Continued)

OTHER PUBLICATIONS

International Search Report for PCT/JP2012/073609 mailed on Dec. 11, 2012.

(Continued)

*Primary Examiner* — Jeffrey Sterrett
(74) *Attorney, Agent, or Firm* — Birch, Stewart, Kolasch & Birch, LLP

(57) ABSTRACT

When an AC voltage is outputted to an inductive load, pulsation of an effective power caused by an odd number-th order harmonic component of a current flowing in this load is reduced. A modulation factor k of an inverter 4 includes a DC component $k_0$ and an AC component. The AC component includes a frequency which is a 6n multiple of the fundamental frequency of AC voltages outputted from the inverter. Even when there are not only the 5th order harmonic component of load currents but also the 7th order harmonic component, it is possible to adequately set the ratio of the magnitude of the AC component and the ratio of the DC component and reduce pulsation of consumption power caused by these harmonic components. Reducing the pulsation contributes to suppression of power harmonics.

12 Claims, 10 Drawing Sheets

(51) Int. Cl.
*H02M 5/45* (2006.01)
*H02M 5/297* (2006.01)
*H02M 5/22* (2006.01)

(56) References Cited

U.S. PATENT DOCUMENTS

| | | | |
|---|---|---|---|
| 8,270,186 B2* | 9/2012 | Sakakibara | H02M 5/271 363/131 |
| 8,913,405 B2* | 12/2014 | Sakakibara | H02M 5/297 363/34 |
| 2011/0176340 A1 | 7/2011 | Sakakibara | |
| 2012/0063178 A1* | 3/2012 | Fujita | H02M 5/4585 363/37 |
| 2012/0163045 A1* | 6/2012 | Fujita | H02M 7/219 363/37 |
| 2013/0016538 A1* | 1/2013 | Fujita | H02M 7/219 363/37 |
| 2014/0233276 A1* | 8/2014 | Fujita | H02M 1/12 363/34 |
| 2014/0369089 A1* | 12/2014 | Sakakibara | H02M 5/4585 363/37 |
| 2015/0280601 A1* | 10/2015 | Sakakibara | H02M 1/15 363/37 |

FOREIGN PATENT DOCUMENTS

| | | |
|---|---|---|
| JP | 2007-312589 A | 11/2007 |
| JP | 4067021 B2 | 3/2008 |
| JP | 4488122 B2 | 6/2010 |

OTHER PUBLICATIONS

Wei et al., "A Novel Matrix Converter Topology With Simple Commutation", IEEE IAS2001, vol. 3, 2001, pp. 1749-1754.

* cited by examiner

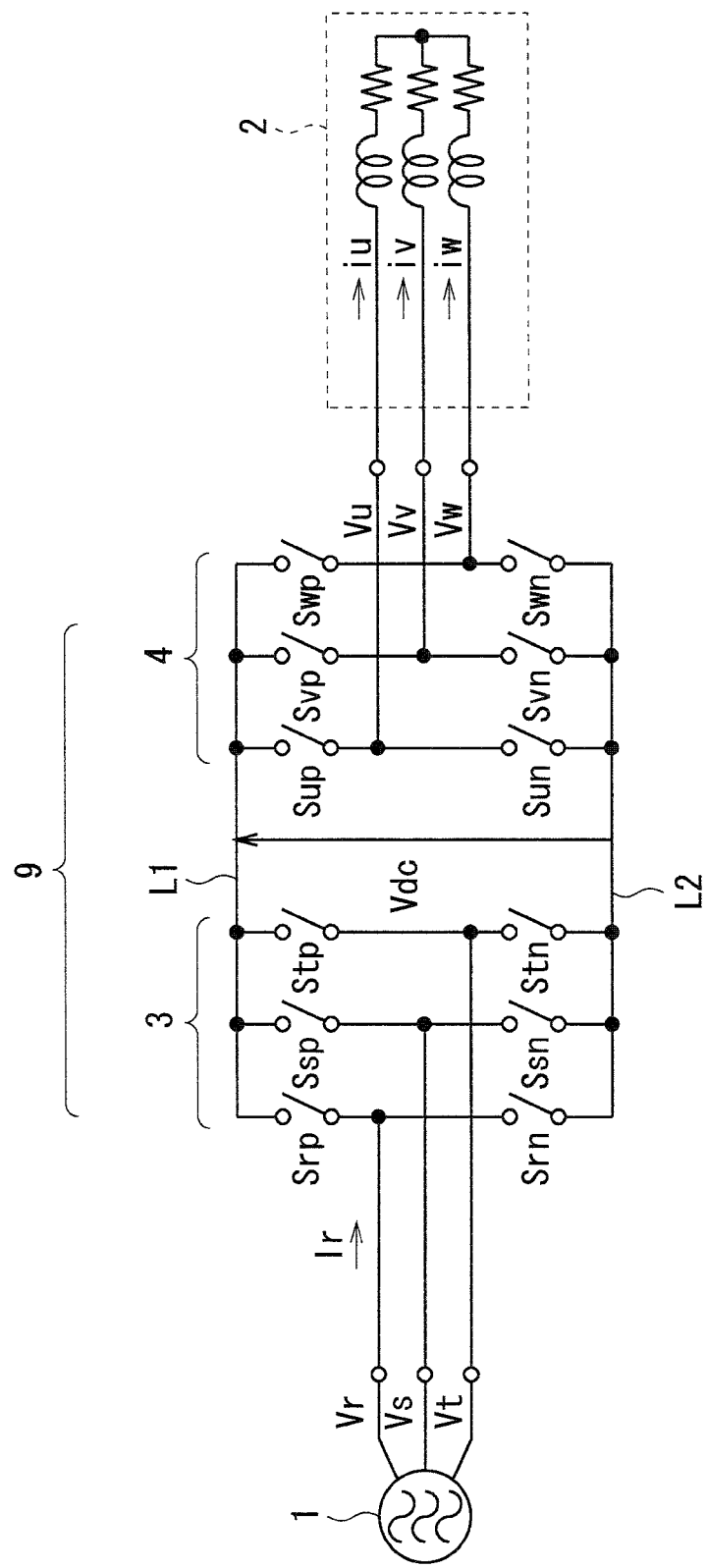
F I G. 1

F I G. 6
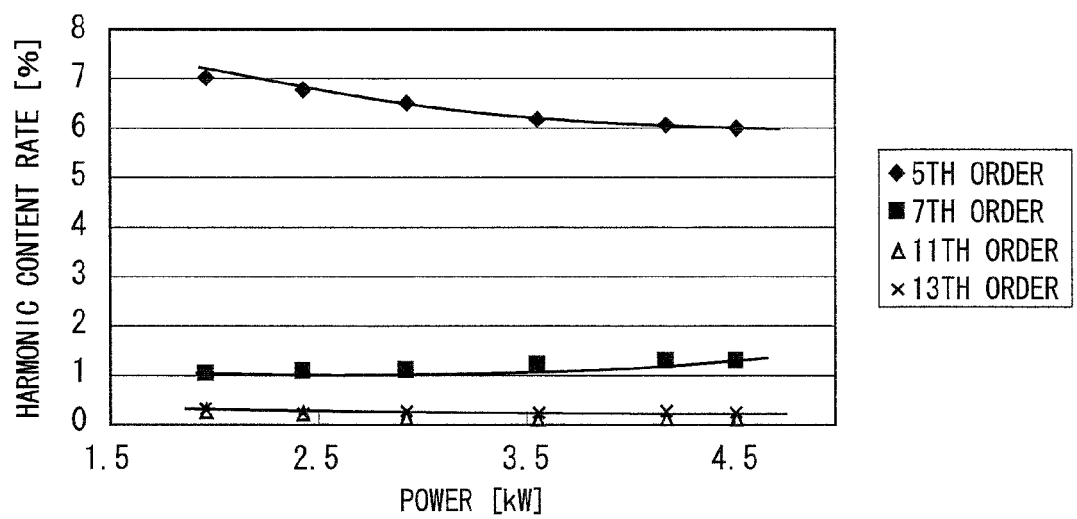
F I G. 7
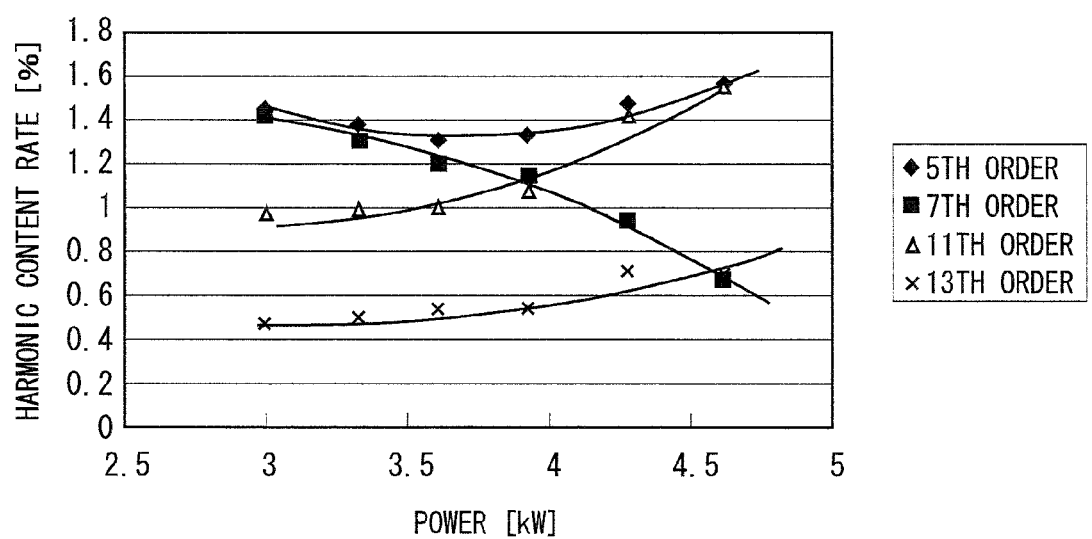

POWER CONVERTER CONTROL METHOD

TECHNICAL FIELD

The present invention relates to a technique of reducing a harmonic of a load current in a so-called AC-AC power converter.

BACKGROUND ART

An inveter is shown as a circuit which drives a multiphase AC load such as a motor. It is known that this inverter employs a configuration (referred to as a "capacitor-less inverter" below) which includes a matrix converter or include a DC link but not a smoothing circuit such as a larger capacitor or a reactor as a circuit system which achieves high efficiency and miniaturization.

Matrix converters include a direct matrix converter which is not provided with DC link and an indirect matrix converter which is provided with DC link. However, as introduced in Japanese Patent Application Laid-Open No. 2004-222338, even a direct matrix converter can be controlled based on an operation of a configuration in which a virtual AC-DC converter and a virtual DC-AC converter which are coupled through virtual DC link without a smoothing circuit.

Further, Japanese Patent No. 4067021 also introduces the above-described capacitor-less inverter, which has a capacitor in a DC link but the capacity of the capacitor is designed to be smaller than a capacity to function as a smoothing circuit. In this technique, voltage of the DC link is supposed to pulsate.

Hence, a circuit which converts AC power without a substantial smoothing circuit irrespectively of whether or not DC link are formally provided or whether or not a capacitor is provided is referred to as a direct AC-AC power converter in the present application.

Direct AC-AC power converter does not involve an energy buffer, and therefore harmonic components produced by a multiphase AC load are propagated to a power side, and harmonics of a power current increase. Reduction of the harmonics of the power current is demanded to prevent negative influences on surrounding environment. A specific example of this demand is, for example, a rule of IEC61000-3-2. According to this rule, harmonic components up to the 40th order with respect to a power frequency are regulated.

Japanese Patent Application Laid-Open No. 2005-27422 points out that, when, for example, a motor is used for a multiphase AC load and concentrated winding is adopted as a winding method of armature windings of the motor, a current (armature current) flowing in the armature windings includes harmonic components and, more particularly, the 5th order component and the 7th order component due to a differential voltage between a voltage outputted from an inverter and an inductive power of a rotating electrical machine. Such harmonic components (with respect to a fundamental wave component of a voltage outputted from the inverter) cause an increase in harmonics of a power current.

Japanese Patent No. 4488122 introduces a technique of reducing the 5th order component and the 7th order component.

SUMMARY OF INVENTION

Problems to be Solved by the Invention

However, the technique introduced in Japanese Patent No. 4488122, without taking only takes into account a phase difference between harmonic components for simplification, has a room for improvement of an effect.

It is therefore an object of the present invention to, when an AC voltage is outputted to an inductive load such as a motor, reduce pulsation of effective power caused by odd number-th order harmonic components of a current flowing in the load. This leads to suppression of pulsation of effective power of DC link in a direct power converter which does not include a smoothing capacitor although the direct power converter has the DC link, and suppression of a power harmonic as a result.

Means for Solving the Problems

A power converter control method according to the present invention is a method of controlling a direct AC-AC power converter (9) which includes: a rectifier circuit (3) which inputs first AC voltages (Vr, Vs, Vt) and outputs a rectified voltage (Vdc); and a voltage source inverter (4) which receives an input of the rectified voltage, applies three-phase second AC voltages (Vu, Vv, Vw) to a load, and outputs three-phase load currents (Iu, Iv, Iw) to the load.

Further, according to a first aspect of the invention, a modulation factor (k) of the voltage source inverter includes a DC component ($k_0$) and an AC component ($k_{6n} \cdot \cos(6n \cdot \omega_L \cdot t + \phi_{6n})$) of an angular frequency ($6n \cdot \omega_L$) which is a 6n multiple of a base fundamental angular frequency ($\omega_L$) of the second AC voltage.

Furthermore, according to a second aspect of the invention, a voltage command (Vd and Vq) to the voltage source inverter includes a DC component (Vd* and Vq*) and an AC component $((-Ju_{6n} \cdot Eu_1)\sin(6n\omega_L + \phi_{6N})(-Ju_{6n} \cdot Eu_1) \cdot \cos(6n\omega_L + \phi_{6N}))$ of an angular frequency ($6n \cdot \omega_L$) which is a 6n multiple of a base fundamental angular frequency ($\omega_L$) of the second AC voltage.

According to both of these first aspect and second aspect of the invention, when a fundamental wave component, a (6n−1)th order component and a (6n+1)th order component of the first load current are $Iu_1$, $Iu_{6n-1}$ and $Iu_{6n+1}$, respectively, and phase differences of the fundamental wave component, the (6n−1)th order component and the (6n+1)th order component of the load current from a fundamental wave component of the second AC voltage are $\phi_1$, $\phi_{6n-1}$ and $\phi_{6n+1}$, respectively, a ratio ($-k_{6n}/k_0$) of an amplitude of the AC component with respect to the DC component takes a ratio represented by $$-[m_{6n}^2 + Iu_{h6n}^2 + 2 \cdot m_{6n} \cdot Iu_{h6n} \cos(\theta - \chi_{6n})]^{1/2}/[Iu_1 \cdot \cos(\phi_1)]$$

$$[m_{6n} = [Iu_{6n-1}^2 + Iu_{6n+1}^2 + 2 \cdot Iu_{6n-1} \cdot Iu_{6n+1} \cdot \cos(\phi_{6n-1} - \phi_{6n+1})]^{1/2}).$$

A phase difference ($\phi_{6n}$) of the AC component from the fundamental wave component of the second AC voltage takes an angle represented by:

$$\tan^{-1}[\{m_{6n} \cdot \sin(\chi_{6n}) + Iu_{h6n} \cdot \sin(\chi_{6n})\}/\{m_{6n} \cdot \cos(\chi_{6n}) + Iu_{h6n} \cdot \cos(\chi_{6n})\}]$$

$$(\chi_{6n} = \tan^{-1}[\{Iu_{6n-1} \cdot \sin(\phi_{6n-1}) + Iu_{6n+1} \cdot \sin(\phi_{6n+1})\}/\{Iu_{6n-1} \cdot \cos(\phi_{6n-1}) + Iu_{6n+1} \cdot \cos(\phi_{6n+1})\}])$$

Here, the angle has relationship of $Iu_{h6n} < m_{6n}$ and $\theta$: arbitrary.

According to a third aspect of the power converter control method according to the present invention is based on the first aspect or the second aspect of the invention, the ratio of the AC component with respect to the DC component is calculated in advance as a function of a plurality of operation states of the load before the load is actually operated, and the direct AC-AC power converter (9) is controlled based on the function upon the actual operation.

According to a fourth aspect of the power converter control method according to the present invention is based on the third aspect, the operation states include a plurality of power states consumed by the load, and the ratio corresponding to the power states upon the actual operation is taken.

A fifth aspect of the power converter control method according to the present invention is based on any one of the first to fourth aspects of the invention, an amplitude of the AC component is increased in a predetermined range of the base fundamental angular frequency ($\omega_L$) of the second AC voltage according to a sensitization amount which increases when the base fundamental angular frequency increases.

For example, $Iu_{h6n}=0$ is true in all n.

Effects of the Invention

According to the first aspect or the second aspect of the power converter control method according to the present invention, the (6n−1)th order component and the (6n+1)th order component of the load are reduced, and then propagation of the harmonic to a supply source of the first AC voltage is reduced.

According to the third aspect of the power converter control method according to the present invention, the ratio of the AC component with respect to the DC component does not need to be calculated based on the second AC voltage and the load current upon the actual operation, and the burden applied to perform control upon the actual operation is reduced.

According to the fourth aspect of the power converter control method according to the present invention, the dependency on other operating statuses other than power states is small, so that it is possible to provide an effect provided by the first aspect and the second aspect only by calculating a power based on the second AC voltage and the load current upon the actual operation.

According to the fifth aspect of the power converter control method according to the present invention, when the base fundamental angular frequency of the second AC voltage increases, the angular frequency which is a 6n multiple of the base fundamental angular frequency becomes close to the frequency at which the power converter is controlled, so that contribution of the AC component decreases as a whole even when the AC component is reflected at a timing at which the power converter is controlled. Consequently, by increasing the amplitude of the AC component in the predetermined range when the base fundamental angular frequency increases, this decrease is compensated.

An object, features, aspects and advantages of the present invention will be made obvious by the following detailed description and the accompanying drawings.

BRIEF DESCRIPTION OF DRAWINGS

FIG. 1 is a circuit diagram illustrating a configuration of a direct power converter to which the present invention is applicable.

FIGS. 6 and 7 are graphs illustrating dependency of a harmonic content rate of an input current on a power.

DESCRIPTION OF EMBODIMENT

A. Configuration of Direct Power Converter

Figure 2:
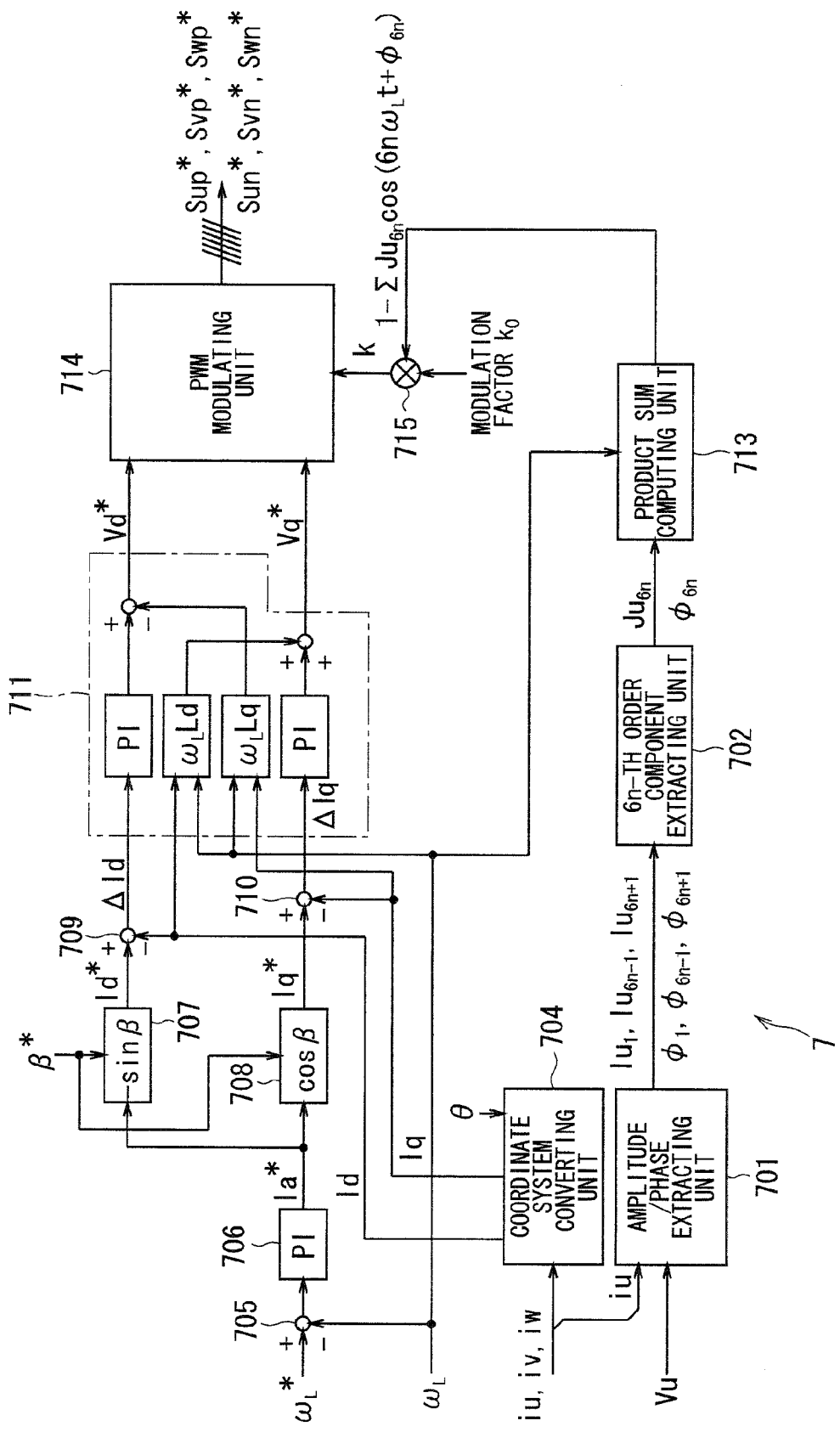
FIG. 2 is a block diagram illustrating a configuration of an inverter control unit.

FIG. 1 is a circuit diagram illustrating a configuration of a direct power converter 9 to which the present invention is applicable. The direct power converter 9 has a converter 3, an inverter 4 and a pair of DC power lines L1 and L2 which connect the converter 3 and the inverter 4.

The converter 3 functions as a rectifier circuit, rectifies three phase (an R phase, an S phase and a T phase, in this case) AC voltages Vr, Vs and Vt (also referred to as "first AC voltages" below) obtained from an AC power source 1, and outputs a rectified voltage Vdc to a pair of DC power lines L1 and L2.

The converter 3 is, for example, a current source rectifier, and operates by pulse width modulation. The converter 3 includes a plurality of current paths which is mutually connected in parallel between the DC power lines L1 and L2. One of the current paths of the converter 3 corresponding to the R phase includes a pair of switching elements Srp and Sm connected in series between the DC power lines L1 and L2. The voltage Vr is applied to a connection point between the switching elements Srp and Sm. One of the current paths of the converter 3 corresponding to the S phase includes a pair of switching elements Ssp and Ssn connected in series between the DC power lines L1 and L2. The voltage Vs is applied to a connection point between the switching elements Ssp and Ssn. One of the current paths of the converter 3 corresponding to the T phase includes a pair of switching elements Stp and Stn connected in series between the DC power lines L1 and L2. The voltage Vt is applied to a connection point between the switching elements Stp and Stn.

The switching elements Srp, Ssp and Stp are connected to the DC power line L1 side, and the switching elements Sm, Ssn and Stn are connected to the DC power line L2 side.

The inverter 4 is, for example, a voltage source inverter, and is operated by pulse width modulation according to, for example, instantaneous space vector control (referred to simply as "vector control" below). The inverter 4 outputs three phase (the U phase, the V phase and the W phase in this case) AC voltages Vu, Vv and Vw (referred to as "second AC voltages" below).

The inverter 4 has a plurality of current paths connected in parallel between the DC power lines L1 and L2.

One of the current paths of the inverter 4 which corresponds to the U phase includes a pair of switching elements Sup and Sun connected in series between the DC power lines L1 and L2. An output voltage Vu is obtained from a connection point of the switching elements Sup and Sun. One of the current paths of the inverter 4 which corresponds to the V phase includes a pair of switching elements Svp and Svn connected in series between the DC power lines L1 and L2. An output voltage Vv is obtained from a connection point between the switching elements Svp and Svn. One of the current paths of the inverter 4 which corresponds to the W phase includes a pair of switching elements Swp and Swn connected in series between the DC power lines L1 and L2. An output voltage Vw is obtained from a connection point between the switching elements Swp and Swn.

The switching elements Sup, Svp and Swp are connected to the DC power line L1 side. These switching elements are regarded as switching elements of an upper arm side below. The switching elements Sun, Svn and Swn are connected to the DC power line L2 side. These switching elements are regarded as switching elements of a lower arm side below. That is, a potential of the DC power line L1 is higher than a potential of the DC power line L2.

Configurations of the above switching elements Sip, Ssp, Stp, Sm, Ssn, Stn, Sup, Svp, Swp, Sun, Svn and Swn are known, and are also disclosed in, for example, in Lixiang Wei, Thomas. A Lipo, "A Novel Matrix Converter Topology With Simple Commutation", IEEE IAS2001, vol. 3, 2001, pp 1749 to 1754.

The load 2 is an inductive load, and is connected to the inverter 4. More specifically, the load 2 is a motor which has three-phase coils which are connected by way of Y connection and to which the voltages Vu, Vv and Vw are applied. Resistor components of the respective three-phase coils in a circuit diagram are illustrated as resistors connected to the coils in series. Currents iu, iv and iw flow in the coils of these coils corresponding to the U phase, the V phase and the W phase. These currents are monitored by a current sensor (not illustrated).

B. Principle to Reduce Harmonics

First, a harmonic of power consumption of the load 2 will be described. When the second AC voltages Vu, Vv and Vw to be applied to the load 2 and the flowing currents (referred to as "load currents" below) iu, iv and iw are discussed, even if the voltage Vu and the load current iu of one phase (U phase) are converted into mathematical expressions like following Expression (1) and Expression (2), universality is not lost. Assuming that the three phases are in stationary states while keeping the balance is sufficient. Hereinafter, only the 5th order harmonic and the 7th order harmonic of the load current iu will be taken into account. In view of Japanese Patent No. 4488122, a coefficient of a fundamental wave component of the second AC voltage Vu includes not only a DC component but also an AC component. Only a harmonic component which is a 6 multiple of the fundamental wave component of the second AC voltage Vu will be first taken into account as the AC component.

[Expression 1]

$$Vu = 2^{1/2}[Eu_1 - Eu_6 \cdot \cos(6\omega_L t + \phi_6)] \cos(\omega_L t) \quad (1)$$

[Expression 2]

$$iu = 2^{1/2}[Iu_1 \cdot \cos(\chi_L t + \phi_1) + Iu_5 \cdot \cos(5\omega_L t + \phi_5) + Iu_7 \cdot \cos(7\omega_L t + \phi_7)] \quad (2)$$

Provide, an angular frequency $\omega_L$ of the fundamental wave component of the current and the voltage outputted from the inverter 4 and a time t are introduced. Further, effective values of the fundamental component, the 5th order component and the 7th order component of the load current iu are $Iu_1$, $Iu_5$ and $Iu_7$, respectively, and phase differences of the fundamental wave component, the 5th order component and the 7th order component of the load current iu from the fundamental wave component of the second AC voltage Vu are $\phi_1$, $\phi_5$ and $\phi_7$, respectively. Furthermore, effective values of the DC component and the AC component of the amplitude of the fundamental wave component of the second AC voltage Vu are $Eu_1$ and $Eu_6$, and the phase difference of this AC component from the fundamental wave component of the voltage Vu is $\phi_6$.

An instantaneous power Pu of the U phase is expressed by Expression (3).

[Expression 3]

$$\begin{aligned} Pu &= Vu \cdot iu \\ &= Eu_1 \cdot Iu_1[\cos(\phi_1) + \cos(2\omega_L t + \phi_1)] + \\ &\quad Eu_1 \cdot Iu_5[\cos(4\omega_L t + \phi_5) + \cos(6\omega_L t + \phi_5)] + \\ &\quad Eu_1 \cdot Iu_7[\cos(6\omega_L t + \phi_7) + \cos(8\omega_L t + \phi_7)] - \\ &\quad (1/2)Eu_6 \cdot Iu_1[\cos(4\omega_L t + \phi_6 - \phi_1) + \cos(6\omega_L t + \phi_6 + \phi_1)] - \\ &\quad (1/2)Eu_6 \cdot Iu_5[\cos(\phi_6 - \phi_5) + \cos(10\omega_L t + \phi_6 + \phi_5)] - \\ &\quad (1/2)Eu_6 \cdot Iu_7[\cos(2\omega_L t + \phi_6 - \phi_7) + \cos(12\omega_L t + \phi_6 + \phi_7)] - \\ &\quad (1/2)Eu_6 \cdot Iu_1[\cos(6\omega_L t + \phi_6 - \phi_1) + \cos(8\omega_L t + \phi_6 + \phi_1)] - \\ &\quad (1/2)Eu_6 \cdot Iu_5[\cos(2\omega_L t + \phi_6 - \phi_5) + \cos(12\omega_L t + \phi_6 + \phi_5)] - \\ &\quad (1/2)Eu_6 \cdot Iu_7[\cos(\phi_6 - \phi_7) + \cos(14\omega_L t + \phi_6 + \phi_7)] \end{aligned} \quad (3)$$

A first term on the right side of Expression (3) represents an active power and an inactive power, and second and subsequent terms represent harmonic powers. Harmonic powers other than those of 3n-th order components are 0 in the three-phase circuits, a power represented by a product of the harmonic components is relatively low and, when these powers are ignored, a harmonic power Puh can be approximated by following Expression (4).

[Expression 4]

$$\begin{aligned} Puh &= Eu_1[Iu_5 \cdot \cos(6\omega_L t + \phi_5) + Iu_7 \cdot \cos(6\omega_L t + \phi_7)] - \\ &\quad (1/2)Eu_6 \cdot Iu_1[\cos(6\omega_L t + \phi_6 + \phi_1) + \cos(6\omega_L t + \phi_6 - \phi_1)] \\ &= Eu_1[Iu_5 \cdot \cos(6\omega_L t + \phi_5) + Iu_7 \cdot \cos(6\omega_L t + \phi_7)] - \\ &\quad Eu_6 \cdot Iu_1 \cdot \cos(\phi_1) \cdot \cos(6\omega_L t + \phi_6) \end{aligned} \quad (4)$$

Hence, it is only necessary to calculate $Eu_6$ and $\phi_6$ which satisfy following Expression (5) and output, from the inverter 4, the voltage Vu defined by Expression (2) using these values to make the harmonic power Puh zero.

[Expression 5]

$$Eu_1[Iu_5 \cdot \cos(6\omega_L t + \phi_5) + Iu_7 \cdot \cos(6\omega_L t + \phi_7)] = Eu_6 \cdot Iu_1 \cdot \cos(\phi_1) \cdot \cos(6\omega_L t + \phi_6) \quad (5)$$

Now, setting $Pu_5 = Eu_1 \cdot Iu_5$, $Pu_7 = Eu_1 \cdot Iu_7$ and $Pu_6 = Eu_6 \cdot Iu_1 \cdot \cos(\phi 1)$, $Pu_5$, $Pu_6$ and $Pu_7$ are allowed to be used as constants. And, Expression (5) is deformed as the following expression.

[Expression 6]

$$Pu_5 \cdot \cos(6\omega_L t + \phi_5) + Pu_7 \cdot \cos(6\omega_L t + \phi_7) = Pu_6 \cdot \cos(6\omega_L t + \phi_6) \quad (6)$$

Further, Expression (6) can be deformed as following Expression (7).

[Expression 7]

$$[Pu_5 \cdot \cos(\phi_5) + Pu_7 \cdot \cos(\phi_7)] \cos(6\omega_L t) - [Pu_5 \cdot \sin(\phi_5) + Pu_7 \cdot \sin(\phi_7)] \sin(6\omega_L t) = Pu_6 \cdot \cos(\phi_6) \cdot \cos(6\omega_L t) - Pu_6 \cdot \sin(\phi_6) \cdot \sin(6\omega_L t) \quad (7)$$

Relationships which satisfy Expression (7) are Expressions (8) and (9) according to orthogonality of a sine function and a cosine function.

[Expression 8]

$$Pu_5 \cdot \cos(\Psi_5) + Pu_7 \cdot \cos(\phi_7) = Pu_6 \cdot \cos(\phi_6) \quad (8)$$

[Expression 9]

$$Pu_5 \cdot \sin(\phi_5) + Pu_7 \cdot \sin(\phi_7) = Pu_6 \cdot \sin(\phi_6) \quad (9)$$

The effective value $Eu_6$ and the phase difference $\phi_6$ are calculated according to Expressions (10) and (11) based on Expressions (8) and (9).

[Expression 10]

$$Eu_6 = Eu_1 \cdot [Iu_5^2 + Iu_7^2 + 2 \cdot Iu_5 \cdot Iu_7 \cos(\phi_5 - \phi_7)]^{1/2} / [Iu_1 \cdot \cos(\phi_1)] \quad (10)$$

[Expression 11]

$$\phi_6 = \tan^{-1}[\{Iu_5 \cdot \sin(\phi_5) + Iu_7 \cdot \sin(\phi_7)\} / \{Iu_5 \cdot \cos(\phi_5) + Iu_7 \cdot \cos(\phi_7)\}] \quad (11)$$

Although the 5th order harmonic and the 7th order harmonic have been described above, the other 6n±1th harmonics (n is a positive integer) can also be discussed likewise. Further, even when the AC component of the amplitude of the fundamental wave component of the voltage Vu includes a plurality of 6n-th angular frequencies, approximation is allowed similar to approximation from Expression (3) to Expression (4). Consequently, it is possible to reduce the harmonic power based on the 6n±1th order harmonic of the load current iu by adopting following Expressions (12), (13) and (14) as the voltage Vu. Provide, a summation sign Σ refers to a sum of n.

[Expression 12]

$$Vu = 2^{1/2} \cdot Eu_1 [1 - \Sigma Ju_{6n} \cdot \cos(6n\omega_L t + \phi_{6n})] \cdot \cos(\omega_L t) \quad (12)$$

[Expression 13]

$$Ju_{6n} = [Iu_{(6n-1)}^2 + Iu_{(6n+1)}^2 + 2Iu_{(6n-1)}Iu_{(6n+1)} \cdot \cos(\phi_{6n-1} - \phi_{6n+1})]^{1/2} \times [Iu_1 \cdot \cos(\phi_1)]^{-1} \quad (13)$$

[Expression 14]

$$\phi_{6n} = \tan^{-1}[\{Iu_{(6n-1)} \cdot \sin(\phi_{6n-1}) + Iu_{(6n+1)} \cdot \sin(\phi_{6n+1})\} / \{Iu_{(6n-1)} \cdot \cos(\phi_{6n-1}) + Iu_{(6n+1)} \cdot \cos(\phi_{6n+1})\}] \quad (14)$$

As is clear from a form of Expression (12), the voltage Vu takes a value obtained by modulating $2^{1/2}Eu_1 \cdot \cos \omega_L t$ by $[1 - \Sigma Ju_{6n}(6n\omega_L t + \phi_{6n})]$. Normally, a sinusoidal voltage is outputted as the voltage Vu, and a so-called modulation factor for obtaining a voltage command corresponds to $k = (k_0 - \Sigma k_{6n} \cdot \cos(6n\omega_L t + \phi_{6n}))$. That is, by taking such a modulation factor k, it is possible to obtain a voltage command corresponding to the voltage Vu. Here, $Ju_{6n} = k_{6n}/k_0$ is true, and is a ratio of the modulation factor with respect to the DC component of the 6n-th component.

Although the U phase has been discussed, the V phase and the W phase can be both analyzed likewise, and Expressions (13) and (14) can be commonly adopted for both of the phases. In other words, the values calculated according to Expressions (13) and (14) are common to every phase.

Hence, it is only necessary to multiply $(1 - \Sigma Ju_{6n} \cdot \cos(6n\omega_L t + \phi_{6n}))$ on or add $-k_0 \Sigma Ju_{6n} \cdot \cos(6n\omega_L t + \phi_{6n})$ to a modulation factor $k_0$ before reduction of the 6n±1th order harmonic is taken into account.

$Eu_6$ and $\phi_6$ which satisfy Expression (5) are calculated above. However, Expression (5) is used to make the harmonic power Puh zero. A value of Expression (4) only needs to be made small instead of actually making the harmonic power Puh zero. More specifically, an absolute value on the left side of Expression (5) only needs to be reduced.

Now, it is assumed that 6th order harmonic power $Pu_{h6}$ after suppression is expressed by following Expression (15). Provide, a phase $\phi u_{h6}$ can be arbitrarily set; a view point of allowing any phase difference as long as the absolute value of the harmonic power $Pu_{h6}$ can be suppressed. Provide, by learning the phase $\phi u_{h6}$ as a phase difference of the fundamental wave component of the load current iu from the fundamental wave component of the AC voltage Vu, and setting a desired value in the following expression, it is possible to set to a desired value the phase of the harmonic power $Pu_{h6}$ which is left without being completely suppressed.

[Expression 15]

$$Pu_{h6} = Eu_1 \cdot Iu_{h6} \cdot \cos(6\omega_L t + \phi u_{h6}) \quad (15)$$

Further, the current $Iu_{h6}$ is desired to be smaller than a value in a square bracket on the left side (corresponding to the harmonic power before suppression) of Expression (5) from a view point of suppressing the harmonic power. More specifically, an amplitude $Pu_{57}$ and a phase difference $\phi u_{57}$ of the harmonic power before suppression are calculated according to following Expressions (16) and (17), respectively. The current $Iu_{h6}$ is desired to be smaller than a value $Iu_{57}$.

[Expression 16]

$$\begin{aligned} Pu_{57} &= [(Pu_5 \cdot \cos(\phi_5) + Pu_7 \cdot \cos(\phi_7))^2 + \\ &\quad (Pu_5 \cdot \sin(\phi_5) + Pu_7 \cdot \sin(\phi_7))^2]^{1/2} \\ &= [Pu_5^2 + Pu_7^2 \cdot 2 \cdot Pu_5 \cdot Pu_7 \cdot \cos(\phi_5 - \phi_7)]^{1/2} \\ &= Eu_1[Iu_5^2 + Iu_7^2 + 2 \cdot Iu_5 \cdot Iu_7 \cdot \cos(\phi_5 - \phi_7)]^{1/2} \\ &= Eu_1 \cdot Iu_{57} \end{aligned} \quad (16)$$

[Expression 17]

$$\begin{aligned} \phi u_{57} &= \tan^{-1}[(Pu_5 \cdot \sin(\phi_5) + Pu_7 \cdot \sin(\phi_7)) / \\ &\quad (Pu_5 \cdot \cos(\phi_5) + Pu_7 \cdot \cos(\phi_7))] \\ &= \tan^{-1}[(Iu_5 \cdot \sin(\phi_5) + Iu_7 \cdot \sin(\phi_7)) / \\ &\quad (Iu_5 \cdot \cos\phi_5 + Iu_7 \cdot \cos(\phi_7))] \end{aligned} \quad (17)$$

$Eu_6$ and $\phi_6$ for correcting the amplitude $Pu_{57}$ of the harmonic power before suppression are calculated as described below. Provide, the amplitude $Pu_6$ is an amplitude of a power (also referred to as a "correction power" below) obtained by subtracting the right side (corresponding to a harmonic power after suppression) of Expression (15) from the left side (corresponding to the harmonic power before suppression) of Expression (6).

[Expression 18]

$$Pu_6 = [(Pu_{57} \cdot \cos\phi u_{57} + Pu_{h6} \cdot \cos(\phi u_{h6} + \pi))^2 + \quad (18)$$
$$(Pu_{57} \cdot \sin\phi_5 + Pu_{h6} \cdot \sin(\phi u_{h6} + \pi))^2]^{1/2}$$
$$= [Pu_{57}^2 + Pu_{h6}^2 + 2 \cdot Pu_{57} \cdot Pu_{h6} \cdot \cos(\phi u_{57} - (\phi u_{h6} + \pi))]^{1/2}$$
$$= Eu_1[Iu_{57}^2 + Iu_{h6}^2 + 2 \cdot Iu_{57} \cdot Iu_{h6} \cdot \cos(\phi u_{57} - (\phi u_{h6} + \pi))]^{1/2}$$

[Expression 19]

$$Eu_6 = Pu_6/(Iu_1 \cdot \cos\phi_1) \quad (19)$$
$$= Eu_1[Iu_{57}^2 + Iu_{h6}^2 + 2 \cdot Iu_{57} \cdot Iu_{h6} \cdot \cos(\phi u_{57} - (\phi u_{h6} + \pi))]^{1/2}/$$
$$(Iu_1 \cdot \cos(\phi_1))$$
$$= Eu_1[Iu_5^2 + Iu_7^2 + 2 \cdot Iu_5 \cdot Iu_7 \cdot \cos(\phi_5 - \phi_7) + Iu_{h6}^2 +$$
$$2\{Iu_5^2 + Iu_7^2 + 2 \cdot Iu_5 \cdot Iu_7 \cdot \cos(\phi_5 - \phi_7)\}^{1/2} \cdot$$
$$Iu_{h6} \cdot \cos(\phi u_{57} - (\phi u_{h6} + \pi))]^{1/2}/(Iu_1 \cdot \cos(\phi_1))$$

[Expression 20]

$$\phi_6 = \tan^{-1}[(Pu_{57} \cdot \sin\phi u_{57} + Pu_{h6} \cdot \sin(\phi u_{h6} + \pi))/ \quad (20)$$
$$(Pu_{57} \cdot \cos\phi u_{57} + Pu_{h6} \cdot \cos(\phi u_{h6} + \pi))]$$
$$= \tan^{-1}[(Iu_{57} \cdot \sin\phi u_{57} + Iu_{h6} \cdot \sin(\phi u_{h6} + \pi))/$$
$$(Iu_{57} \cdot \cos\phi u_{57} + Iu_{h6} \cdot \cos(\phi u_{h6} + \pi))]$$
$$= \tan^{-1}[(\{Iu_5^2 + Iu_7^2 + 2 \cdot Iu_5 \cdot Iu_7 \cdot \cos(\phi_5 - \phi_7)\}^{1/2} \cdot$$
$$\sin\phi u_{57} + Iu_{h6} \cdot \sin(\phi u_{h6} + \pi))/$$
$$(\{Iu_5^2 + Iu_7^2 + 2 \cdot Iu_5 \cdot Iu_7 \cdot \cos(\phi_5 - \phi_7)\}^{1/2} \cdot$$
$$\cos\phi u_{57} + Iu_{h6} \cdot \cos(\phi u_{h6} + \pi))]$$
$$= \tan^{-1}[(\{Iu_5^2 + Iu_7^2 + 2 \cdot Iu_5 \cdot Iu_7 \cdot \cos(\phi_5 - \phi_7)\}^{1/2} \cdot$$
$$\sin(\tan^{-1}\{(Iu_5 \cdot \sin(\phi_5) + Iu_7 \cdot \sin(\phi_7))/$$
$$(Iu_5 \cdot \cos(\phi_5) + Iu_7 \cdot \cos(\phi_7))\}) + Iu_{h6} \cdot \sin(\phi u_{h6} + \pi))/$$
$$[\{Iu_5^2 + Iu_7^2 + 2 \cdot Iu_5 \cdot Iu_7 \cdot \cos(\phi_5 - \phi_7)\}^{1/2} \cdot$$
$$\cos(\tan^{-1}[(Iu_5 \cdot \sin(\phi_5) + Iu_7 \cdot \sin(\phi_7))/$$
$$(Iu_5 \cdot \cos(\phi_5) + Iu_7 \cdot \cos(\phi_7))]) + Iu_{h6} \cdot \cos(\phi u_{h6} + \pi)]$$

By this means, Expressions (21) and (22) are obtained similar to Expressions (13) and (14).

[Expression 21]

$$Ju_{6n} = \{Iu_{(6n-1)}^2 + Iu_{(6n+1)}^2 + 2 \cdot Iu_{(6n-1)} \cdot Iu_{(6n+1)} \cdot \cos$$
$$(\phi_{(6n-1)} - \phi_{(6n+1)}) + Iu_{h(6n)}^2 + 2 \cdot \{Iu_{(6n-1)}^2 + Iu_{(6n+1)}^2 +$$
$$2 \cdot Iu_{(6n-1)} \cdot Iu_{(6n+1)} \cdot \cos(\phi_{(6n-1)} - \phi_{(6n+1)})\}^{1/2} \times$$
$$Iu_{h(6n)} \cos(\tan^{-1}[(Iu_{(6n-1)} \cdot \sin(\phi_{(6n-1)}) + Iu_{(6n+1)} \cdot \sin$$
$$(\phi_{(6n+1)}))/Iu_{(6n-1)} \cdot \cos(\phi_{(6n-1)}) + Iu_{(6n+1)} \cdot \cos$$
$$(\phi_{(6n+1)})] - (\phi u_{h(6n)} + \pi))\}^{1/2}/(Iu_1) \cdot \cos(\phi_1)) \quad (21)$$

[Expression 22]

$$\phi_{6n} = \tan^{-1}[(\{Iu_{(6n-1)}^2 + Iu_{(6n+1)}^2 + 2 \cdot Iu_{(6n-1)} \cdot Iu_{(6n+1)} \cdot \cos$$
$$(\phi_{(6n-1)} - \phi_{(6n+1)})\}^{1/2} \times \sin(\tan^{-1}\{(Iu_{(6n-1)} \cdot \sin$$
$$(\phi_{(6n-1)}) + Iu_{(6n+1)} \cdot \sin(\phi_{(6n+1)}))/(Iu_{(6n-1)} \cdot \cos$$
$$(\phi_{(6n-1)}) + Iu_{(6n+1)} \cdot \cos(\phi_{(6n+1)}))\}) + Iu_{h(6n)} \cdot \sin(\phi u_h$$
$$(6n) + \pi))/(\{Iu_{(6n-1)}^2 + Iu_{(6n+1)}^2 + 2 \cdot Iu_{(6n-1)} \cdot$$
$$Iu_{(6n+1)} \cdot \cos(\phi_{(6n-1)} - \phi_{(6n+1)})\}^{1/2} \times \cos(\tan^{-1}$$
$$\{(Iu_{(6n-1)} \cdot \sin(\phi_{(6n-1)}) + Iu_{(6n+1)} \cdot \sin(\phi u_{h(6n+1)}))/$$
$$(Iu_{(6n-1)} \cdot \cos(\phi_{(6n-1)}) + Iu_{(6n+1)} \cdot \cos(\phi_{(6n+1)}))\}) +$$
$$Iu_{h(6n)} \cdot \cos(\phi u_{h(6n)} + \pi))] \quad (22)$$

As described above, the phase $\phi u_{h6}$ can be arbitrarily set, so that $\theta = \phi u_{h6} + \pi$ may be used and $\theta$ may be arbitrarily set. Further, when the current $Iu_{57}$ is redescribed as $m_6$, this way of description is applied to the 6n-th order likewise and can be described as follows.

That is, setting $$[m_{6n} = [Iu_{6n-1}^2 + Iu_{6n+1}^2 + 2 \cdot Iu_{6n-1} \cdot Iu_{6n+1} \cdot \cos(\phi_{6n-1} - \phi_{6n+1})]^{1/2}$$

$$\chi_{6n} = \tan^{-1}[\{Iu_{6n-1} \cdot \sin(\phi_{6n-1}) + Iu_{6n+1} \cdot \sin(\phi_{6n+1})\}/$$
$$\{Iu_{6n-1} \cdot \cos(\phi_{6n-1}) + Iu_{6n+1} \cdot \cos(\phi_{6n+1})\}]$$

$Iu_{h6n} < m_{6n}$, and
$\theta$ is arbitrary, $$Ju_{6n} = [m_{6n}^2 + Iu_{h6n}^2 + 2 \cdot m_{6n} \cdot Iu_{h6n} \cos(\theta - \chi_{6n})]^{1/2}/$$
$$[Iu_1 \cdot \cos(\phi_1)] \text{ is true and}$$

$$\phi_{6n} = \tan^{-1}[\{m_{6n} \cdot \sin(\chi_{6n}) + Iu_{h6n} \cdot \sin(\chi_{h6n})\}/\{m_{6n} \cdot \cos$$
$$(\chi_{6n}) + Iu_{h6n} \cdot \cos(\chi_{6n})\}] \text{ is true.}$$

Similarly, the modulation factor can also be expressed as $k_{6n}/k_0 = [m_{6n}^2 + Iu_{h6n}^2 + 2 \cdot m_{6n} \cdot Iu_{h6n} \cos(\theta - \chi_{6n})]^{1/2}/[Iu_1 \cdot \cos(\phi_1)]$.

Naturally, by making $Iu_{h6n} = 0$ for all n, Expressions (21) and (22) match with Expressions (13) and (14).

C. Configuration to Reduce Harmonics (c-1) Correction of Modulation Factor

FIG. 2 is a block diagram illustrating a configuration of an inverter control circuit 7 which takes the modulation factor k for reducing the 6n±1th order harmonics. The inverter control circuit 7 inputs the angular frequency $\omega_L$ and a command value $\omega_L^*$ of the angular frequency $\omega_L$, the second AC voltage Vu, the load currents iu, iv and iw, a phase control command value $\beta^*$ and a motor angle estimation value $\theta$, and outputs gate signals Sup*, Svp*, Swp*, Sun* and Swn*.

An amplitude/phase extracting unit 701 inputs the load current iu, and generates a fundamental wave component, the 6n−1th order component and the 6n+1th order component of the load current iu. This computation is realized by performing Fourier transform on the load current iu. By this means, effective values $Iu_1$, $Iu_{6n-1}$ and $Iu_{6n+1}$ are obtained. Further, the amplitude/phase extracting unit 701 further inputs the voltage Vu, compares the phase of the voltage Vu and phases of the fundamental wave component, the 6n−1th order component and the 6n+1th order component of the load current iu, and generates and outputs the phase differences $\phi_1$, $\phi_{6n-1}$ and $\phi_{6n+1}$.

A 6n-th order component computing unit 702 obtains the effective values $Iu_1$, $Iu_{6n-1}$ and $Iu_{6n+1}$ and the phase differences $\phi_1$, $\phi_{6n-1}$ and $\phi_{6n+1}$ from the amplitude/phase extracting unit 701, and computes a ratio $Ju_{6n}$ and a phase difference $\phi_{6n}$ according to Expressions (13) and (14). For example, n=1, 2 is selected. Alternatively, the 6n-th order component computing unit 702 computes and outputs the ratio $Ju_{6n}$ and the phase difference $\phi_{6n}$ according to Expressions (21) and (22) by also using the phase difference $\chi_{6n}$ and the current $Iuh_{6n}$. The phase difference $\chi_{6n}$ and the current $Iuh_{6n}$ may be externally inputted to or set inside the 6n-th order component computing unit 702.

A product sum computing unit 713 computes $[1 - \Sigma Ju_{6n} \cdot \cos(6n\omega_L t + \phi_{6n})]$ from the ratio $Ju_{6n}$ and the phase difference $\phi_{6n}$ obtained from the 6n-th order component computing unit 702.

A multiplier 715 multiplies the modulation factor $k_0$ for simply outputting a sinusoidal voltage and $[1 - \Sigma Ju_{6n} \cos(6n\omega_L t + \phi_{6n})]$, and outputs the multiplication result as a new modulation factor k. By taking the modulation factor k as described above, it is possible to reduce the harmonic power based on the 6n±1th harmonic of the load current iu (the load currents iv and iw likewise).

A PWM modulating unit 714 generates gate signals Sup*, Svp*, Swp*, Sun*, Svn* and Swn* using a d axis voltage command value Vd*, a q axis voltage command value Vq* and the modulation factor k. These gate signals are generated by adopting a known technique, and therefore details of this computation will not be described. In other words, only by substituting the modulation factor $k_0$ with the modulation factor k, it is possible to divert a known technique and reduce the harmonic power based on the 6n±1th order harmonics.

A technique for obtaining the command values Vd* and Vq* is also a known technique, and will be briefly described below without details.

A subtractor 705 calculates a deviation of the angular frequency $\omega_L$ and the command value $\omega_L^*$ of the angular frequency $\omega_L$ to input to a PI control unit 706. The PI control unit 706 generates a current command value Ia* by performing known PI control (proportion/integration control). A d axis current command value generating unit 707 and a q axis current command value generating unit 708 inputs the current command value Ia* and the phase control command value β*, and calculates a sine component and a cosine component of the current command value Ia* as a d axis current command value Id* and a q axis current command Iq*, respectively, for (−β*), which has negative sign with the phase control command values β*.

A coordinate system converting unit 704 calculates the d axis current Id and the q axis current Iq based on the load currents iu, iv and iw and the motor angle estimation value θ to output to the subtractors 709 and 710, respectively.

The subtractor 709 outputs a deviation ΔId of the d axis current Id and the command value Id* of the d axis current Id. The subtractor 710 outputs a deviation ΔIq of the q axis current Iq and the command value Iq* of the q axis current Iq.

An interference compensating unit 711 performs computation for compensating for a mutual interference between the d axis and the q axis according to impedances $\omega_L \cdot Ld$ and $\omega_L \cdot Lq$ based on inductances Ld and Lq of a motor. The interference compensating unit 711 inputs the d axis current Id, the q axis current Iq, the deviations ΔId and ΔIq and the angular frequency $\omega_L$, and generates the d axis voltage command Vd* and the q axis voltage command Vq*. This computation is a known technique, and will not be described in details.

(c-2) Correction of Voltage Command

Figure 3:
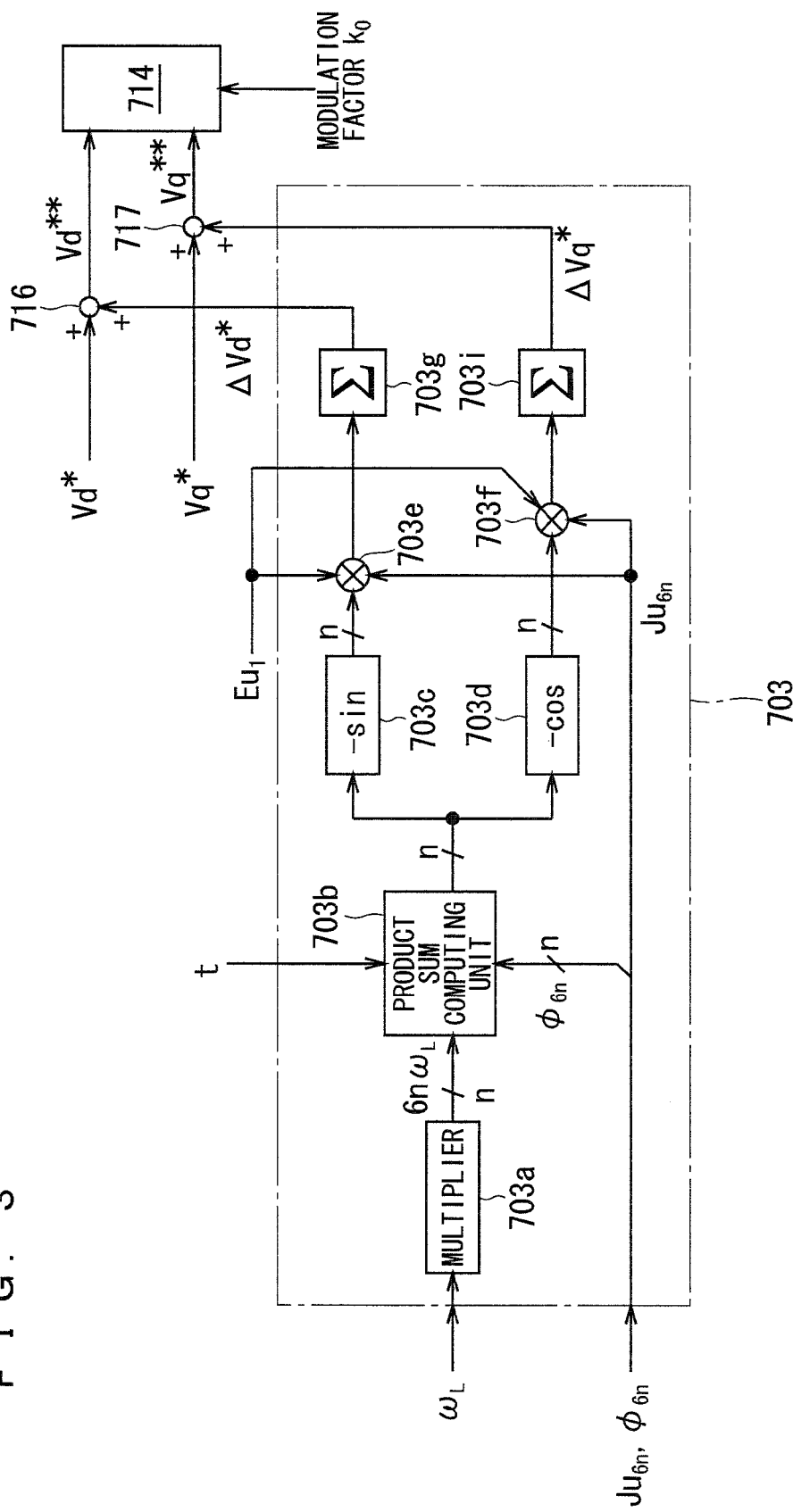
FIG. 3 is a graph illustrating a relationship between a voltage command and a gate signal.

FIG. 3 is a block diagram illustrating part of other components of the inverter control circuit 7. Unlike the inverter control circuit 7 illustrated in FIG. 2, a modulation factor is not corrected using the multiplier 715, and the PWM modulating unit 714 generates gate signals based on the modulation factor $k_0$. However, in this case, the PWM modulating unit 714 adopts corrected d axis voltage command Vd and q axis voltage command Vq not the d axis voltage command Vd* and q axis voltage command Vq* described using FIG. 2.

Although FIG. 3 does not illustrate a configuration for obtaining the ratio $Ju_{6n}$, the phase difference $\phi_{6n}$, the d axis voltage command Vd* and the q axis voltage command Vq*, it is obvious that the same configuration as the configuration illustrated in FIG. 2 can be employed.

In addition, the inverter control circuit 7 illustrated in FIG. 3 has adders 716 and 717 and a correction command generating unit 703 instead of the product sum computing unit 713 and the multiplier 715 in the inverter control circuit 7 illustrated in FIG. 2.

Hereinafter, generation of the corrected d axis voltage command Vd and the q axis voltage command Vq will be described. First, similar to the inverter control circuit 7 illustrated in FIG. 2, the ratio $Ju_{6n}$, the phase difference $\phi_{6n}$, the d axis voltage command Vd* and the q axis voltage command Vq* are obtained.

The correction command generating unit 703 inputs the ratio $Ju_{6n}$ and the phase difference $\phi_{6n}$, and generates a d axis voltage command correction value ΔVd* and a q axis voltage command correction value ΔVq*.

The adder 716 adds the d axis voltage command Vd* and the d axis voltage command correction value ΔVd* to output the corrected d axis voltage command Vd**. The adder 717 adds the q axis voltage command Vq* and the q axis voltage command correction value ΔVq* to output the corrected q axis voltage command Vq**.

The correction command generating unit 703 has a multiplier 703a, a product sum computing unit 703b, a sine value calculator 703c, a cosine value calculator 703d, multipliers 703e and 703f and total sum calculators 703g and 703i.

The multiplier 703a inputs the angular frequency $\omega_L$, multiplies the angular frequency $\omega_L$ with a 6n multiple and outputs the 6n-th order angular frequency $6n\omega_L$. Here, n is a positive integer, and that n angular frequencies $6n\omega_L$ are outputted is indicated by adding a diagonal line to an arrow from the multiplier 703a to the product sum computing unit 703b, and "n" is indicated near the arrow. That is, this diagonal line and "n" indicate that n pieces of information are transmitted. The same applies to diagonal lines added to other arrows, and "n".

The product sum computing unit 703b adds the phase difference $\phi_{6n}$ of the same order, to a result obtained by multiplying the angular frequency $6n\omega_L$ with the time t. That is, the product sum computing unit 703b performs n pairs of multiplication and addition per corresponding angular frequency. By this means, the product sum computing unit 703b feeds the phase $(6n\omega_L + \phi_{6n})$ to both of the sine value calculator 703c and the cosine value calculator 703d. The sine value calculator 703c and the cosine value calculator 703d output a value obtained by multiplying a sine value with a (−1) multiple and a value obtained by multiplying a cosine value with a (−1) multiple as the inputted phases, respectively. More specifically, the sine value calculator 703c and the cosine value calculator 703d output $-\sin(6n\omega_L + \phi_{6n})$ and $-\cos(6n\omega_L + \phi_{6n})$, respectively.

Each of n values outputted from the sine value calculator 703c is multiplied with the ratio $Ju_{6n}$ corresponding to each value n, the DC component $Eu_1$ of the amplitude of the fundamental wave component of the second AC voltage Vu and a coefficient $\sqrt{(3/2)}$ in the multiplier 703e, and then is outputted as a value $\sqrt{(3/2)}(-Ju_{6n} \cdot Eu_1) \cdot \sin(6n\omega_L + \phi_{6n})$. Similarly, the multiplier 703f outputs $\sqrt{(3/2)}(-Ju_{6n} \cdot Eu_1) \cdot \cos(6n\omega_L + \phi_{6n})$.

The DC component $Eu_1$ can be obtained by performing Fourier transform on the second AC voltage Vu in, for example, the amplitude/phase extracting unit 701 illustrated in FIG. 2. The coefficient $\sqrt{(3/2)}$ is a necessary coefficient in view of that, while voltage commands for d and q axes determine line voltages, the DC component $Eu_1$ corresponds to a phase voltage.

The total sum calculator 703g calculates a total sum of values $\sqrt{(3/2)}(-Ju_{6n} \cdot Eu_1) \cdot \sin(6n\omega_L + \phi_{6n})$ by n to output as the d axis voltage command correction value ΔVd*. The total sum calculator 703i calculates a total sum of values $\sqrt{(3/2)}(-Ju_{6n} \cdot Eu_1) \cos(6n\omega_L + \phi_{6n})$ by n to output as the q axis voltage command correction value ΔVq*.

As described above, the (corrected) d axis voltage command Vd** is obtained by adding the d axis voltage command correction value ΔVd* to the axis voltage command Vd*, and the (corrected) q axis voltage command Vq** is obtained by adding the q axis voltage command correction value ΔVq* to the q axis voltage command Vq*.

Generally, the modulation factor k is proportional to a ratio of a line voltage of the second AC voltages with respect to the rectified voltage Vdc, and the line voltage is proportional to a square root of a sum of squares of the d axis voltage command and the q axis voltage command.

Hence, performing processing based on the modulation factor $k_0$ and the corrected d axis voltage command Vd and q axis voltage command Vq upon generation of the gate signals Sup*, Svp*, Swp*, Sun*, Svn* and Swn* by the PWM modulating unit 714 is equivalent to performing processing based on the modulation factor k, and the d axis voltage command Vd* and the q axis voltage command Vq* which are not corrected.

Further, the d axis voltage command Vd* and the q axis voltage command Vq* can be both learned as phasors which are orthogonal in a rotating coordinate system which rotates at the base fundamental angular frequency $\omega_L$ of the second AC voltage, and both correspond to $\sqrt{(3/2)}Eu_1$. Hence, in the corrected d axis voltage command Vd**, the d axis voltage command Vd* before correction can be learned as a DC component, and the d axis voltage command correction value ΔVd* can be learned as an AC component including the 6n-th order angular frequency. In the q axis voltage command Vq**, the q axis voltage command Vq* before correction can be learned as a DC component, and the q axis voltage command correction value ΔVq* can be learned as an AC component including the 6n-th order angular frequency.

Consequently, irrespectively of the d axis or the q axis, the ratio of the amplitude of the AC component with respect to the DC component is $|[\sqrt{(3/2)}(-Ju_{6n}\cdot Eu_1)]/[\sqrt{(3/2)}Eu_1]|=Ju_{6n}$, and is equal to the ratio in case where a modulation factor is corrected.

D. Effect to Reduce Harmonic

Figure 4:
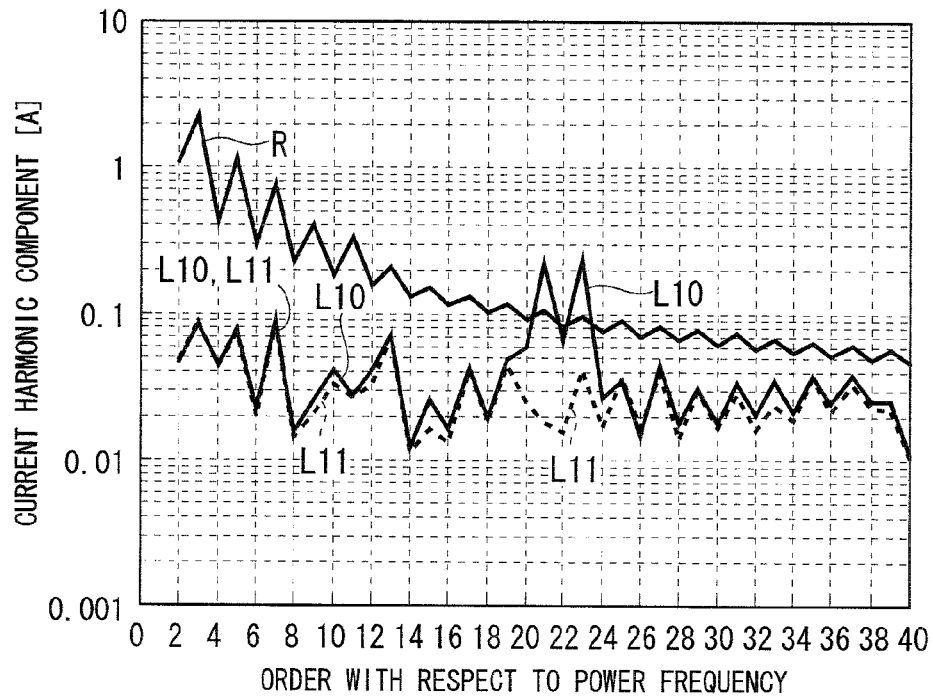
FIGS. 4 and 5 are graphs illustrating dependency of harmonic components of an input current on an order with respect to a power frequency.
Figure 5:
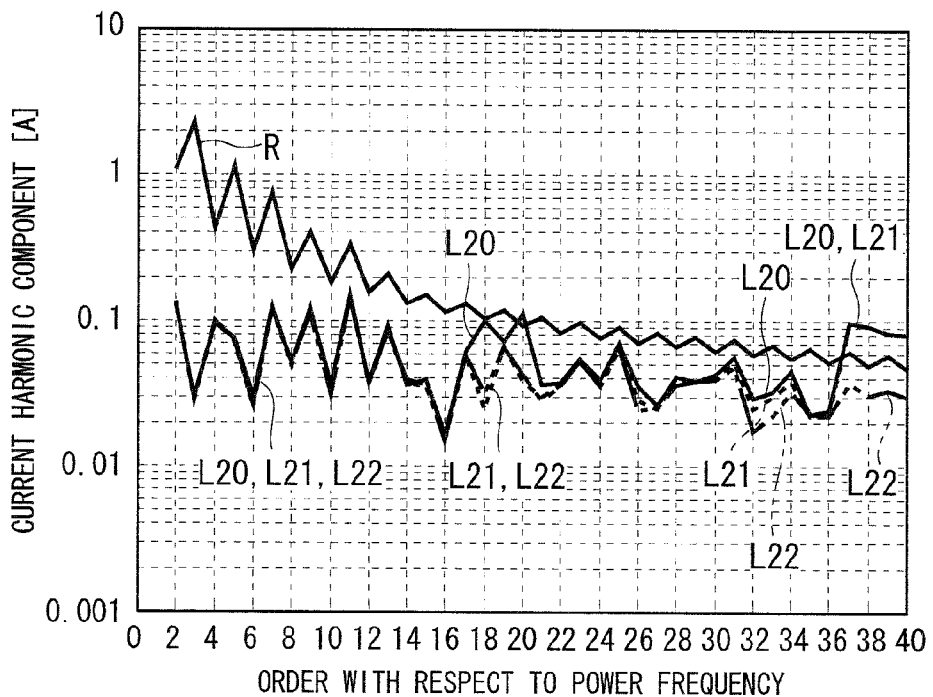

Meanwhile, a case where an effect to reduce a harmonic is remarkable will be described. That is, a case where a current $Iu_{h6n}=0$ in all n will be described. FIGS. 4 and 5 are graphs illustrating dependency of harmonic components of an input current Ir supplied from the power source 1 to the direct power converter 9, on an order with respect to a power frequency. In each graph, the horizontal axis takes the order based on a power frequency and a vertical axis indicates the amplitude of a current harmonic component with respect to a fundamental wave component of a second AC voltage.

FIG. 4 illustrates that concentrated winding is adopted as a winding method of armature windings of a motor which is the load 2. FIG. 5 illustrates that distributed winding is adopted as a winding method of armature windings of a motor which is the load 2. A graph L10 in FIG. 4 and a graph L20 in FIG. 5 indicate relationship between an order and a harmonic component when the inverter 4 is operated using the modulation factor $k_0$, the d axis voltage command Vd* and the q axis voltage command Vq* without reducing harmonics. Further, in both of FIGS. 4 and 5, graphs R indicate upper limits of harmonic components based on the rule of IEC61000-3-2.

As is seen from FIG. 4, the graph L10 increases at the 21st order and the 23rd order, and do not satisfy the rule of IEC61000-3-2 indicated by the graph R. This is because of the following reason.

As is understood from above Expression (4), the harmonic power Puh pulsates at an angular frequency which is a 6n multiple of the angular frequency (which is also an angular frequency of the second AC voltage) $\omega_L$ of the load current iu. Hence, even when the rectified voltage Vdc is controlled to keep constant, a current flowing in the DC link fluctuates at $\cos(6n\cdot\omega_L t)$.

By the way, when a current source rectifier is used as the converter 3, it is possible to make an input current be a sine wave by modulating a current flowing in the DC link by a sine wave taking into account a conduction ratio of each phase (see, for example, Lixiang Wei, Thomas. A Lipo, "A Novel Matrix Converter Topology With Simple Commutation", IEEE IAS2001, vol. 3, 2001, pp 1749 to 1754. and Japanese Patent Application Laid-Open No. 2007-312589). More specifically, the current is modulated by $\cos(\omega_S t)$ by using the angular frequencies $\omega_S$ of the voltages Vr, Vs and Vt. Hence, the input current Ir pulsates at $\cos(\omega_S t)\cdot\cos(6n\cdot\omega_L t)$. This pulsation component is deformed as $(\frac{1}{2})(\cos(6n\cdot\omega_L t-\omega_S t)+\cos(6n\cdot\omega_L t+\omega_S t))$. Hence, the harmonic components of the input current Ir come to peaks at the frequency $6n\cdot f_L \pm f_S$ ($f_L=\omega_L/2\pi$ and $f_S=\omega_S/2\pi$).

In FIG. 4, the power frequency $f_S$ is 50 Hz, and the frequency $f_L$, of the second AC voltage Vu is set to 180 Hz. Hence, 180×6±50=1030 and 1130 [Hz] of the harmonic components of the input current Ir have peaks. When 1030 and 1130 are converted into power frequencies $f_S$=50 Hz, 1030/50≈21 [st order] and 1130/50≈23 [rd order] are true.

Similarly, in FIG. 5, the graph L20 increases at the 18th order, the 20th order and the 37 to 40th orders, and does not satisfy the rule of IEC61000-3-2 indicated by the graph R. Here, the power frequency $f_S$ is 50 Hz and the frequency $f_L$, of the second AC voltage Vu is set to 160 Hz, and therefore the frequencies of harmonics to be produced are 160×6±50=910 and 1010 and correspond to the 18th order and the 20th order of the power frequency. Further, the frequencies are 160×12±50=1870 and 1970, and correspond to the 37 to 40th orders of the power frequency. When distributed winding is adopted as a winding method of armature windings as described above, a harmonic component of a higher order tends to cause a problem compared to concentrated winding.

A graph L11 in FIG. 4 indicates harmonic components of the input current Ir when the 6th order AC component described in the above B section is included in the modulation factor k. The 21 to 23rd order harmonic components of a power frequency in particular are reduced compared to the graph L10. As is known from the above description, this is caused by reduction in 5th order and 7th order harmonic components in a load current compared to the fundamental frequency component of the second AC voltage.

Similarly, a graph L21 in FIG. 5 indicates harmonic components of the input current Ir when the 6th order AC component described in the above B section is included in the modulation factor k. The 18th order and 20th order harmonic components of a power frequency in particular are reduced compared to the graph L10. As is known from the above description, this is caused by reduction in the 5th order and 7th order harmonic components of the load current with respect to the fundamental frequency of the second AC voltage. Meanwhile, the 37 to 40th order harmonic components of a power frequency are not reduced.

A graph L22 in FIG. 5 indicates harmonic components of the input current Ir when the 6th order and 12th order AC components described in the above B section are included in the modulation factor k. Not only the 18th order and 20th order but also the 37 to 40th order harmonic components of a power frequency in particular are reduced compared to the graph L10. As is known from the above description, this is caused by reduction in not only the 5th order and 7th order but also the 11th order and 13th order harmonic components of a fundamental frequency component of a load current of the second AC voltage.

To reduce the harmonic components in this way, the adequate ratio $Ju_{6n}$ and phase difference $\phi_{6n}$ are set depending on the harmonic power Puh as described in the above B section (Expressions (4) to (14) in particular). In other words, these values depend on power.

FIGS. 6 and 7 are graphs illustrating dependency of a harmonic content rate [%] in the input current Ir, on a power (load power consumption: the same applies below) in corresponding motors in FIGS. 4 and 5. Provide, the order is converted based on the fundamental frequency of the second AC voltage.

As is known from FIG. 6, when concentrated winding is adopted, the 5th order component decreases in response to an increase in power, and the 7th order component does not increase much. Further, what is known from FIG. 7 is that, when distributed winding is adopted, the 5th order component slightly increases, the 7th order component significantly decreases and the 11th order component and the 13th order component both increase in response to an increase in power. Furthermore, when distributed winding is adopted, the 5th component is very little compared to concentrated winding.

In view of the above and based on the discussion of the B section, it is predicted that the ratio $Ju_6$ decreases following an increase in the power, and the ratio $Ju_6$ in case where distributed winding is adopted is lower than the ratio $Ju_6$ in case where concentrated winding is adopted. Further, when the power is the same, it is also predicted that there is little dependency on parameters other than a winding method (concentrated winding/distributed winding) of armature windings. Hereinafter, validity of these predictions will be described using experiment results.

Figure 8:
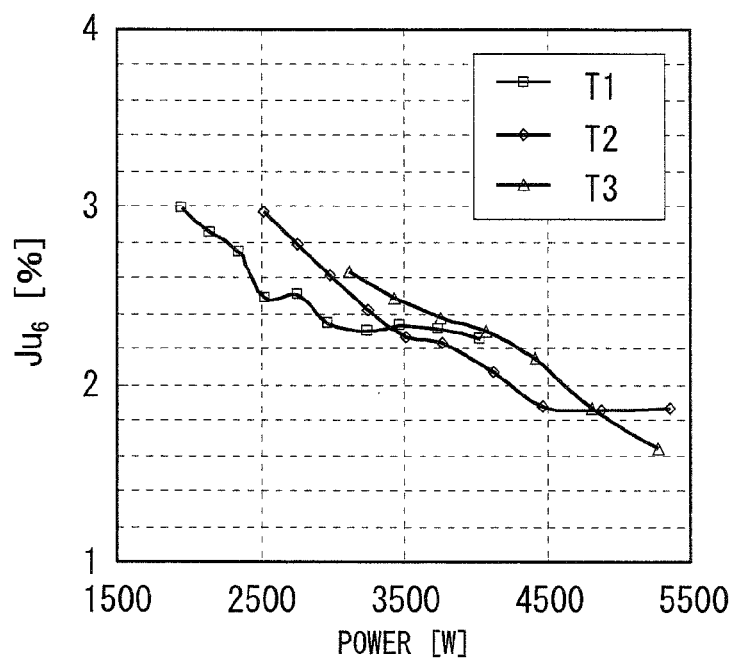
FIGS. 8 and 9 are graphs illustrating dependency of a ratio $Ju_6$ on a power in a motor whose winding method of armature windings is distributed winding.
Figure 9:
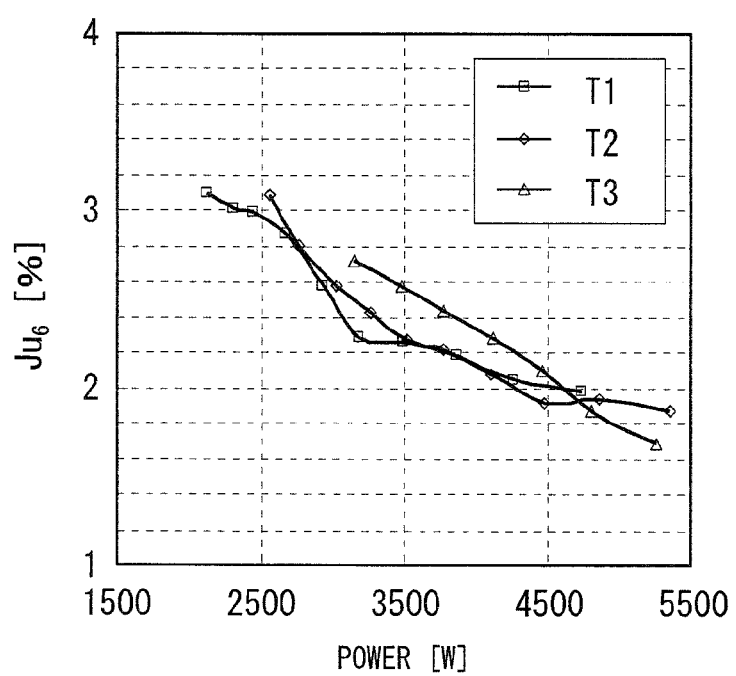
Figure 10:
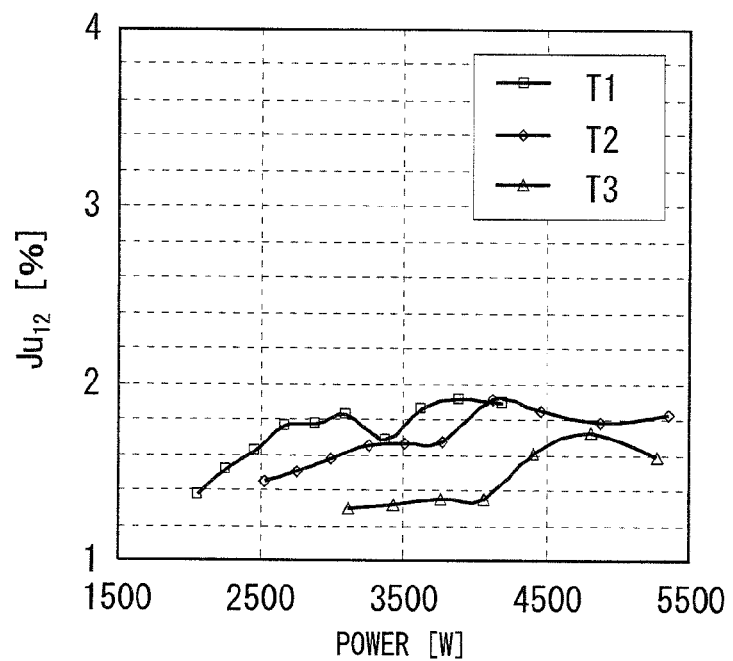
FIGS. 10 and 11 are graphs illustrating dependency of a ratio $Ju_{12}$ on a power in the motor whose winding method of armature windings is distributed winding.
Figure 11:
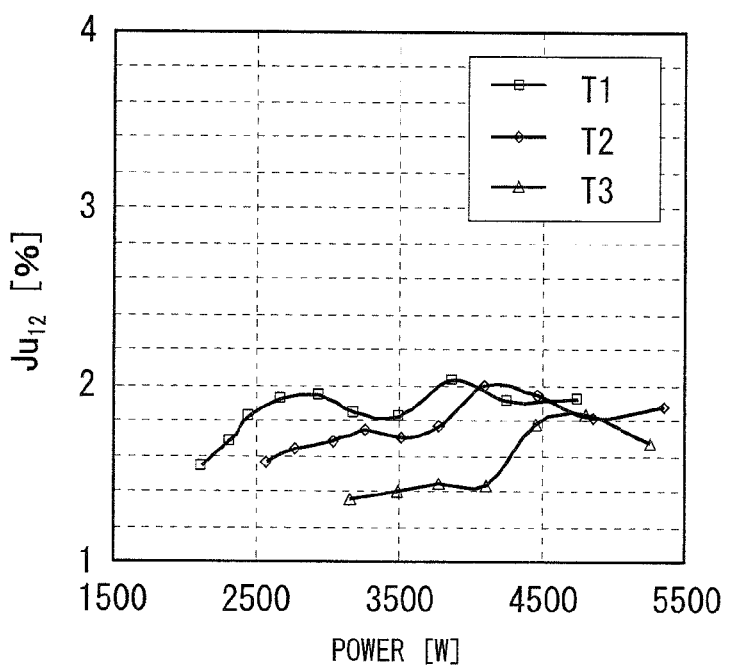

FIGS. 8 and 9 are both graphs illustrating dependency of the ratio $Ju_6$ [%] on a power in a motor whose winding method of armature windings is distributed winding. FIGS. 10 and 11 are both graphs illustrating dependency of the ratio $Ju_{12}$ [%] on a power in a motor whose winding method of armature windings is distributed winding. Each figure illustrates dependency of three types of load torques T1, T2 and T3 (T1<T2<T3). Provided, the motor from which the result in FIG. 8 is obtained and the motor from which the result in FIG. 10 is obtained are the same, and the motor from which the result in FIG. 9 is obtained and the motor from which the result in FIG. 11 is obtained are the same. Further, field magnetic fluxes of the motors from which the results in FIGS. 8 and 10 are obtained are less than field magnetic fluxes of the motors from which the results in FIGS. 9 and 11 are obtained.

As is understood from FIGS. 8 and 11, the ratio $Ju_6$ tends to decrease in response to an increase in the power. Further, the ratio $Ju_{12}$ tends to increase in response to an increase in the power. Moreover, the ratios $Ju_6$ and $Ju_{12}$ both hardly depend on load torques or whether field magnetic fluxes are larger or smaller.

Hence, by obtaining dependencies of the ratios $Ju_6$ and $Ju_{12}$ on powers in a motor which includes armature windings for which distributed winding is adopted as a winding method, it is possible to take the ratios $Ju_6$ and $Ju_{12}$ commonly between operation states of motors such as torques other than a power or types of motors of other than a winding method of armature windings such as field magnetic fluxes.

Figure 12:
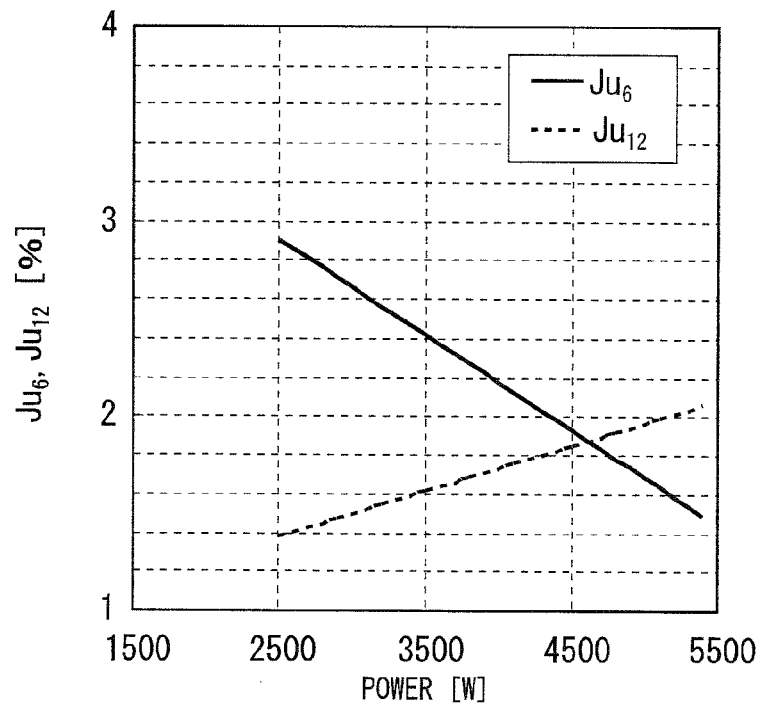
FIG. 12 is a graph illustrating curves obtained by linearly approximating average values of the ratios $Ju_6$ and $Ju_{12}$.

FIG. 12 is a graph illustrating a curve obtained linearly approximating an average value of the ratios $Ju_6$ obtained from FIGS. 8 and 9 and a curve obtained by linearly approximating an average value of the ratio $Ju_{12}$ obtained from FIGS. 10 and 11. By measuring and storing dependencies of the ratios $Ju_6$ and $Ju_{12}$ indicated by these curves, on powers in advance, the ratios $Ju_6$ and $Ju_{12}$ upon an actual operation are obtained only by calculating powers based on output voltages and load currents.

More specifically, the ratios $Ju_6$ and $Ju_{12}$ of a plurality of power states may be calculated before the load 2 is actually operated, and be stored the relationship between a plurality of power states and the ratios $Ju_6$ and $Ju_{12}$ in a table or as a numerical expression. This table or numerical expression may be stored by the 6n-th order component computing unit 702 or the amplitude/phase extracting unit 701.

Figure 13:
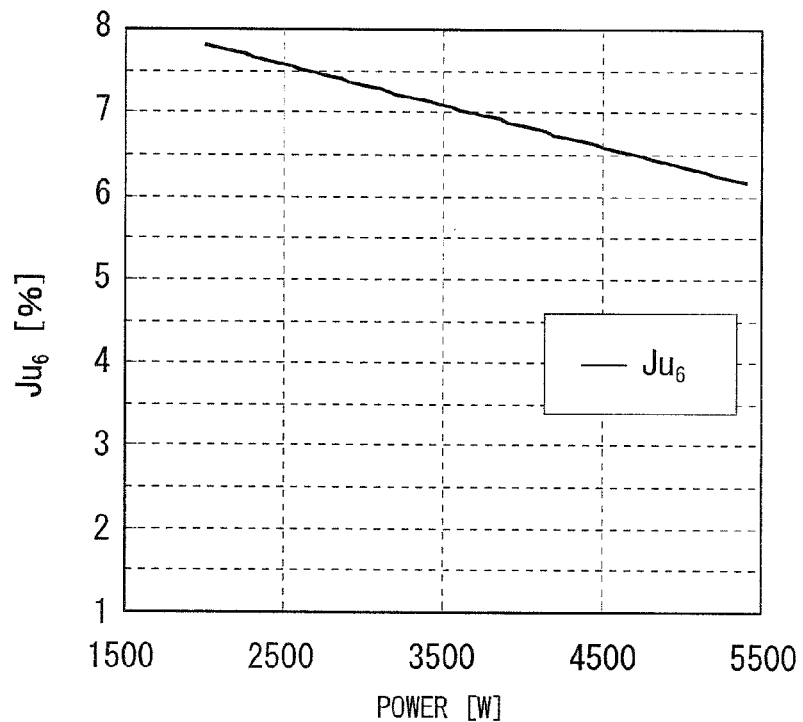
FIG. 13 is a graph illustrating a curve obtained by linearly approximating an average value of dependencies of the ratio $Ju_6$ on the power in the motor whose winding method of armature windings is concentrated winding.

FIG. 13 is a graph illustrating a curve obtained by linearly approximating an average value of dependencies of the ratio $Ju_6$ [%] on a power in a motor whose winding method of armature windings is concentrated winding. Similar to FIG. 12, the ratio $Ju_6$ tends to decrease following an increase in the power, and is high compared to the motor whose winding method of armature windings is distributed winding as predicted above.

Hence, it is desirable to calculate and store in advance the ratios $Ju_6$ and $Ju_{12}$ per winding method of armature windings or per power before a load is actually operated. By this means, a burden of the calculation amount upon an actual operation is reduced.

Although the above discussion has been made on the ratio $Ju_6$, it goes without saying that this discussion is also validly applied to the d axis voltage command correction value $\Delta Vd^*$ and the q axis voltage command $Vq^*$ in view of the principle described in the B section. That is, it is desirable to calculate and store in advance the d axis voltage command correction value $\Delta Vd^*$ and the q axis voltage command $Vq^*$ per winding method of armature windings or per power before a load is actually operated. By this means, the calculation amount upon an actual operation is reduced.

Naturally, dependencies of the ratio $Ju_{6n}$ or the d axis voltage command correction value $\Delta Vd^*$ and the q axis voltage command $Vq^*$ on not only a power state and a winding method of armature windings but also a plurality of operation states such as a magnitude of a motor torque or a motor rotation speed may be obtained and stored as a table or a function. The power state can also be learned as a type of an operation state.

E. Correction Accompanying Rise in Frequency of Second AC Voltage

The PWM modulating unit 714 generates the gate signals Sup*, Svp*, Swp*, Sun*, Svn* and Swn* at temporally discrete timings using the d axis current command value Id*, the q axis current command value Iq* and the modulation factor k or the corrected d axis voltage command Vd and q axis voltage command Vq and the modulation factor $k_0$. A cycle of the timings is determined according to a carrier frequency which serves as a basis of comparison when, for example, a carrier comparison method is adopted in the PWM modulating unit 714.

Normally, the carrier frequency is fixed, so that, when a fundamental frequency component of a second AC voltage increases, the number of gate signals to be updated for the fundamental frequency decreases.

Particularly, the modulation factor k and the corrected d axis voltage command Vd and q axis voltage command Vq include frequencies which are a 6n multiple of the fundamental frequency, and are not likely to be reflected at adequate timings to update gate signals.

That is, when the fundamental frequency component of the second AC voltage increases, the ratio $Ju_{6n}$, the d axis voltage command correction value $\Delta Vd^*$ and the q axis voltage command correction value $\Delta Vq^*$ substantially decrease. Further, this tendency becomes remarkable when the order of a harmonic, that is, the value n increases.

Figure 14:
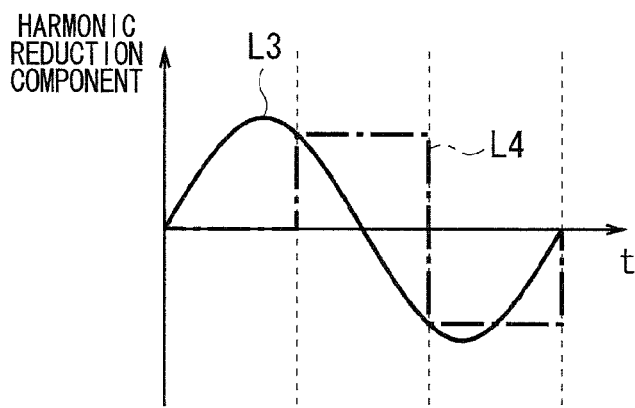
FIG. 14 is a graph illustrating a relationship between a fundamental frequency component and a decrease.

FIG. 14 is a graph schematically illustrating this decrease. A curve L3 indicates that the value $Ju_{6n} \cdot \cos(6n\omega_L t + \phi_{6n})$, and the d axis voltage command correction value $\Delta Vd^*$ and the q axis voltage command correction value $\Delta Vq^*$ (also referred to as "harmonic reduction components" below) as 6n-th order harmonic components fluctuate. Further, a broken line indicates timings to generate the gate signals Sup*, Svp*, Swp*, Sun*, Svn* and Swn*. Hence, between these timings, the harmonic reduction components continue to take values of closed circles indicating intersections between the broken line and the curve L3. That is, the harmonic reduction components which are indicated by the sine wave shape curve L3 ideally (when intervals between these timing are sufficiently short; in other words, when the fundamental frequency of the second AC voltage is sufficiently small), form a stepwise curve L4.

Hence, it is desirable to set a sensitization amount to increase the ratio $Ju_{6n}$, the d axis voltage command correction value $\Delta Vd^*$ and the q axis voltage command correction value $\Delta Vq^*$, and increase the sensitization amount when the fundamental frequency components of the second AC voltages Vu, Vv and Vw increase. This is to compensate for the decrease.

Figure 15:
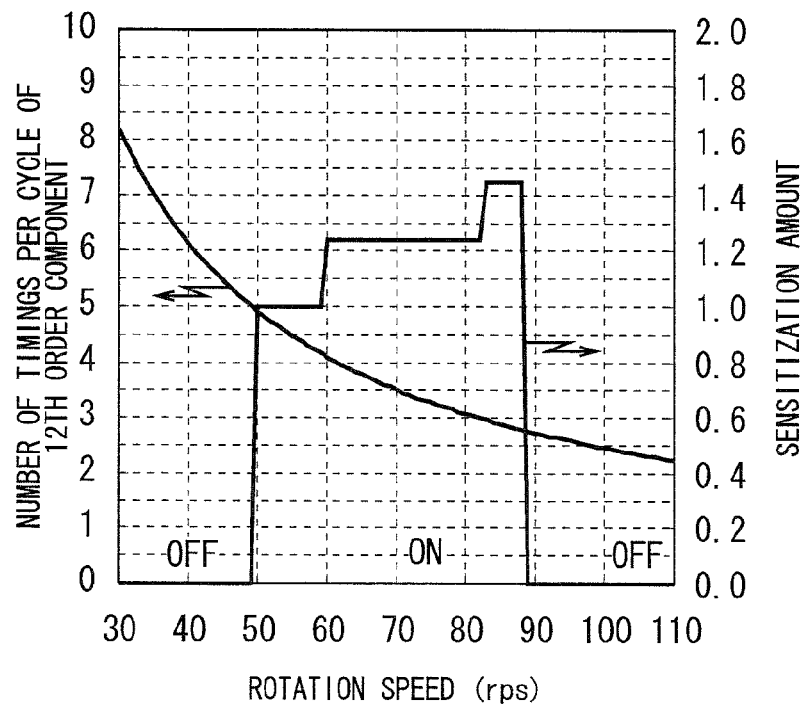
FIG. 15 is a graph illustrating the number of timings in association with a rotation speed.

FIG. 15 is a graph illustrating the number of timings in association with rotation speeds when a motor is used for the load 2. The number of timings indicates the number of timings to generate gate signals per one cycle of a harmonic reduction component (the 12th order component in this case).

The rotation speed is indicated with the number of rotations (rps) per second, and, when the number of pairs of poles of a motor is 2, 50×2=100 [Hz] obtained by converting the rotation speed 50 rps into a frequency corresponds to the fundamental frequency of the second AC voltage. Hence, the 12th order component of the harmonic reduction component is 1200 Hz. Now, when a carrier frequency is 6 kHz and when the rotation speed is 50 rps, the number of timings is 6000/1200=5.

FIG. 15 also illustrates the sensitization amount. Meanwhile, the sensitization amount is illustrated as a value which needs to be multiplied on a harmonic reduction component set based on the discussion of the B section. The sensitization amount increases at 50 to 88 rps of the rotation speed (which corresponds to 100 to 1400 Hz of the fundamental frequency) when the rotation speed increases. That is, in a predetermined range of a base fundamental angular frequency of a second AC voltage, the amplitude of the harmonic reduction component is increased according to the sensitization amount which increases when the fundamental frequency increases. Taking the modulation factor k results in increasing the modulation ratio $Ju_{6n}$.

In addition, the sensitization amount is zero when the rotation speed is less than 50 rps, the harmonic reduction component is not substantially used (which is indicated as "OFF" in FIG. 15). This is because, when the order of a harmonic of a power frequency is lower, the upper limit of a harmonic current is higher according to the rule of IEC61000-3-2. More specifically, this is because, in an example illustrated in FIG. 15, a 12 multiple of the base fundamental angular frequency of the second AC voltage is 1200 Hz, the component of 1200±50 Hz in an input current is smaller than the upper limit of the rule and a harmonic of a load current does not need to be suppressed.

Further, the sensitization amount is zero when the rotation speed is 88 rps or more, and the harmonic reduction component is not substantially used (which is indicated as "OFF" in FIG. 15). This is because an upper limit is not set to the 40th order harmonic or more of a power frequency according to the rule of IEC61000-3-2. More specifically, a value which is a 12 multiple of a frequency corresponding to 88 rps of the rotation speed is 2112 Hz, 2062 Hz of a frequency which is 50 Hz of a power frequency lower than this 2112 Hz corresponds to the 41st order of the power frequency and is not limited by the rule of IEC61000-3-2. Consequently, the harmonic reduction component may not be used when the rotation speed is 88 rps or more.

Similar to the ratio $Ju_6$, the d axis voltage command correction value $\Delta Vd^*$ and the q axis voltage command correction value $\Delta Vq^*$, such a sensitization amount may also be obtained in advance per power state and winding method of armature windings, or further, per magnitude of a motor torque or motor rotation speed, and may be stored as a table or a function.

In addition, it is possible to increase the number of timings with respect to a rotation speed by increasing a carrier frequency and, consequently, raise a range of a rotation speed which requires a sensitization amount. In other words, when the carrier frequency is higher, setting the sensitization amount until a range of a high rotation speed is less necessary. Elements which can increase switching frequencies such as wideband gap elements made of SiC or GaN can be used for the switching elements Srp, Ssp, Stp, Srn, Ssn, Stn, Sup, Svp, Swp, Sun, Svn and Swn to support an increase in a carrier frequency.

F. Modification

Further, a main circuit system to which the present embodiment is applied is not limited to a system provided with the DC link illustrated in FIG. 1. That is, the main circuit system may be applied to a direct AC-AC power converter of a virtual DC link system introduced in Japanese Patent Application Laid-Open No. 2004-222338.

Figure 16:
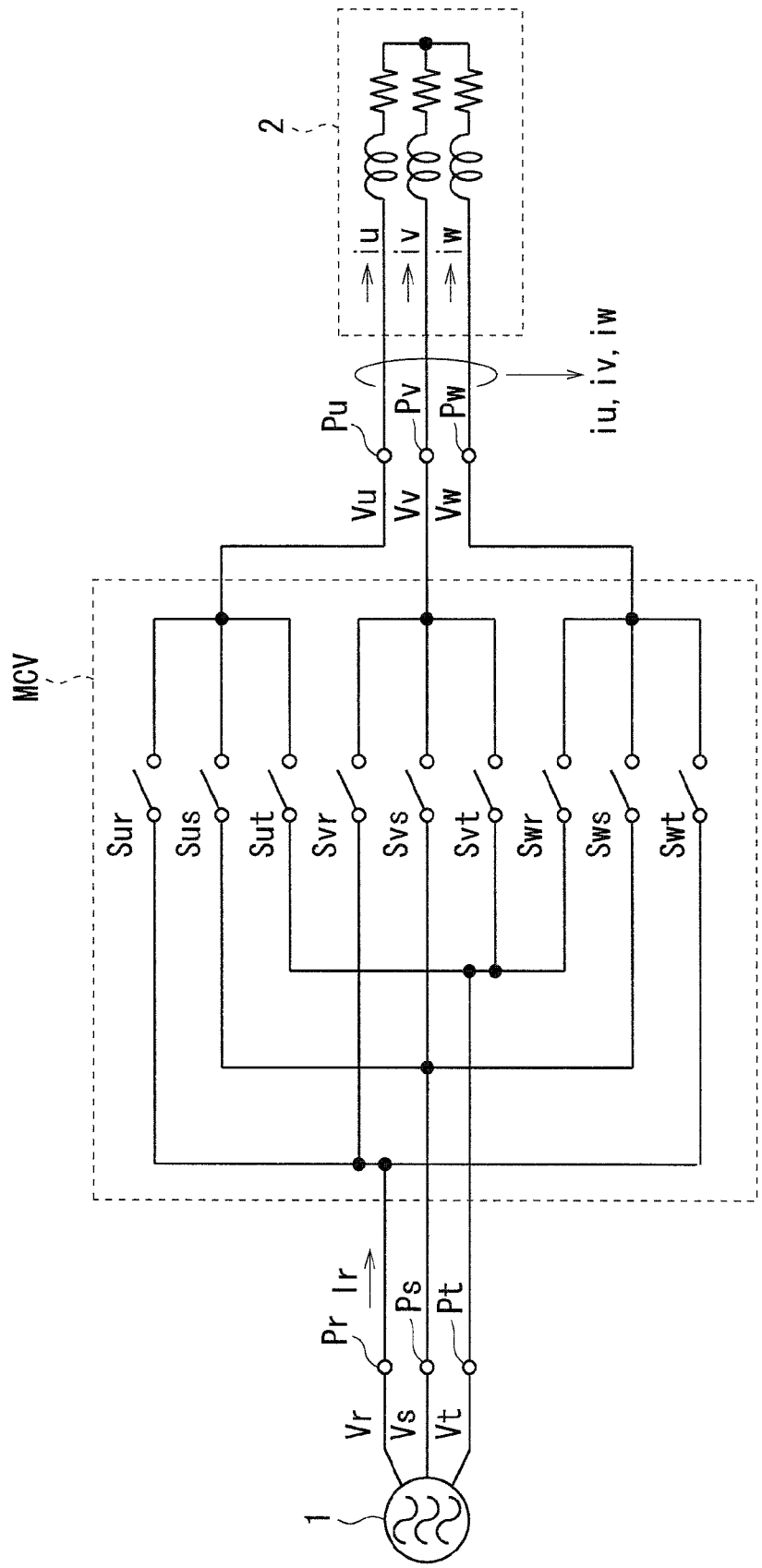
FIG. 16 is a circuit diagram illustrating a configuration of a direct matrix converter to which the present invention is applicable.

FIG. 16 is a circuit diagram illustrating a configuration of another direct power converter to which the present embodiment is applied. Here, a direct matrix converter MCV will be described as the direct power converter.

The direct matrix converter MCV has input terminals Pr, Ps and Pt and output terminals Pu, Pv and Pw. The input terminals Pr, Ps and Pt input AC voltages Vr, Vs and Vt, and the output terminals Pu, Pv and Pw output three-phase AC output voltages Vu, Vv and Vw.

The direct matrix converter MCV has switching elements Sur, Sus, Sut, Svr, Svs, Svt, Swr, Sws and Swt. The three switching elements Sur, Sus and Sut are connected between each of the input terminals Pr, Ps and Pt and the output terminal Pu. The three switching elements Svr, Svs and Svt are connected between each of the input terminals Pr, Ps and Pt and the output terminal Pv. The three switching elements Swr, Sws and Swt are connected between each of the input terminals Pr, Ps and Pt and the output terminal Pw.

When a control method according to the present embodiment is applied to the direct matrix converter MCV, virtual AC/DC/AC control is adopted. In virtual AC/DC/AC control, for example, a converter 3 and an inverter 4, which are shown in FIG. 1, are virtually assumed. As a virtual DC link, a pair of DC power lines L1 and L2 connecting the converter 3 and the inverter 4 can be assumed. That is, in the virtual AC/DC/AC control adopted by the direct matrix converter MCV, the converter 3 as a virtual rectifier circuit which virtually rectifies AC voltages Vr, Vs and Vt and obtains a virtual rectified voltage Vdc, and the inverter 4 as a virtual voltage source inverter which obtains AC voltages Vu, Vv and Vw from the virtual rectified voltage Vdc are assumed respectively. Further, similar to the matters which have already been described, gate signals Sup*, Svp*, Swp*, Sun*, Svn* and Swn are generated to include a DC component $k_0$ and an AC component $(-k_0 \Sigma Ju_{6n} \cdot \cos(6n\omega_L t + \phi_{6n}))$ of an angular frequency $6n\omega_L$ which is a 6n multiple of the base angular frequencies $\omega_L$ of the second AC voltages Vu, Vv and Vw in the modulation factor k of the virtual voltage source inverter. These gate signals control an operation of the inverter 4 which is a virtual voltage source inverter.

In order to switch the converter 3 as a virtual rectifier circuit, similarly to switching of the actual converter 3, referring to, for example, Lixiang Wei, Thomas. A Lipo, "A Novel Matrix Converter Topology With Simple Commutation", IEEE IAS2001, vol. 3, 2001, pp 1749 to 1754. or Japanese Patent Application Laid-Open No. 2007-312589, gate signals Srp*, Ssp*, Stp*, Srn*, Ssn* and Stn* which control conduction/non-conduction of switching elements Srp, Ssp, Stp, Srn, Ssn and Stn are obtained.

Further, matrix transform is performed according to the following equation to obtain switch signals of the direct matrix converter MCV from the gate signals Srp*, Ssp*, Stp*, Srn*, Ssn*, Stn*, Sup*, Svp*, Swp*, Sun*, Svn* and Swn*.

[Expression 23]

$$\begin{bmatrix} S13 & S23 & S33 \\ S12 & S22 & S32 \\ S11 & S21 & S31 \end{bmatrix} = \begin{bmatrix} Sup^* & Sun^* \\ Svp^* & Svn^* \\ Swp^* & Swn^* \end{bmatrix} \begin{bmatrix} Srp^* & Ssp^* & Stp^* \\ Srn^* & Ssn^* & Stn^* \end{bmatrix} \quad (23)$$

Switch signals S11, S12, S13, S21, S22, S23, S31, S32 and S33 are switch signals for the switching elements Sur, Sus, Sut, Svr, Sys, Svt, Swr, Sws and Swt, respectively. That this matrix transform is valid is already known from Japanese Patent Application Laid-Open No. 2004-222338.

Further, as introduced in Japanese Patent No. 4067021, application to a conversion circuit which uses a very small capacitor is allowed. Alternatively, an input side of the converter 3 which feeds an output to DC link may be a single-phase input or a multiphase input.

Although the present invention has been described in details, the above description is exemplary in all aspects and the present invention is by no means limited to this. It is understood that an infinite number of modified examples which have not been described are assumed as long as the modified examples do not deviate from the scope of the present invention.

The invention claimed is:

1. A power converter control method of controlling a direct AC-AC power converter which comprises: a rectifier circuit which inputs first AC voltages and outputs a rectified voltage; and a voltage source inverter which inputs said rectified voltage, applies three-phase second AC voltages to a load, and outputs three-phase load currents to said load, wherein
   a modulation factor of said voltage source inverter includes a DC component and an AC component which is an angular frequency which is a 6n multiple (n is a natural number) of a base fundamental angular frequency of said second AC voltage, and
   when a fundamental wave component, a (6n−1)th order component and a (6n+1)th order component of said load current are $Iu_1$, $Iu_{6n-1}$ and $Iu_{6n+1}$, respectively, and phase differences of said fundamental wave component, said (6n−1)th order component and said (6n+1)th order component of said load current from a fundamental wave component of said second AC voltage are $\Phi_1$, $\Phi_{6n-1}$ and $\Phi_{6n+1}$, respectively,
   a ratio of an amplitude of said AC component with respect to said DC component takes a ratio represented by $-[m_{6n}^2 + Iu_{h6n}^2 + 2 \cdot m_{6n} \cdot Iu_{h6n} \cos(\theta - \chi_{6n})]^{1/2}/[Iu_1 \cdot \cos(\Phi_1)]$ $(m_{6n} = [Iu_{6n-1}^2 + Iu_{6n+1}^2 + 2 \cdot Iu_{6n-1} \cdot Iu_{6n+1} \cdot \cos(\Phi_{6n-1} - \Phi_{6n+1})]^{1/2})$, and a phase difference ($\Phi_{6n}$) of said AC component from the fundamental wave component of said second AC voltage takes an angle represented by $\tan^{-1}[\{m_{6n} \cdot \sin(\chi_{6n}) + Iu_{h6n} \cdot \sin(\chi_{6n})\}/\{m_{6n} \cdot \cos(\chi_{6n}) + Iu_{h6n} \cdot \cos(\chi_{6n})\}]$ $(\chi_{6n} = \tan^{-1}[\{Iu_{6n-1} \cdot \sin(\Phi_{6n-1}) + Iu_{6n+1} \cdot \sin(\Phi_{6n+1})\}/\{Iu_{6n-1} \cdot \cos(\Phi_{6n-1}) + Iu_{6n+1} \cdot \cos(\Phi_{6n+1})\}])$, with relationship of $Iu_{h6n} < m_{6n}$ and θ: arbitrary.

2. The power converter control method according to claim 1, wherein
   the ratio of said AC component with respect to said DC component is calculated in advance as a function of a plurality of operation states of said load before said load is actually operated, and
   said direct AC-AC power converter is controlled based on said function upon said actual operation.

3. The power converter control method according to claim 2, wherein
   said operation states include a plurality of power states consumed by said load, and
   said ratio corresponding to said power states upon said actual operation is taken.

4. The power converter control method according to claim 1, wherein $Iu_{h6n}=0$ is true in all n.

5. The power converter control method according to claim 1, wherein an amplitude of said AC component is increased in a predetermined range of said base fundamental angular frequency of said second AC voltage according to a sensitization amount which increases when said base fundamental angular frequency increases.

6. The power converter control method according to claim 5, wherein $Iu_{h6n}=0$ is true in all n.

7. A power converter control method of controlling a direct AC-AC power converter which comprises: a rectifier circuit which inputs first AC voltages and outputs a rectified voltage; and a voltage source inverter which inputs said rectified voltage, applies three-phase second AC voltages to a load, and outputs three-phase load currents to said load, wherein
   a voltage command to said voltage source inverter includes a DC component and an AC component of an angular frequency which is a 6n multiple (n is a natural number) of a base fundamental angular frequency of said second AC voltage, and
   when a fundamental wave component, a (6n−1)th order component and a (6n+1)th order component of said load current are $Iu_1$, $Iu_{6n-1}$ and $Iu_{6n+1}$, respectively, and phase differences of said fundamental wave component, said (6n−1)th order component and said (6n+1)th order component of said load current from a fundamental wave component of said second AC voltage are $\Phi_1$, $\Phi_{6n-1}$ and $\Phi_{6n+1}$, respectively,
   a ratio of an amplitude of said AC component with respect to said DC component takes a ratio represented by $-[m_{6n}^2 + Iu_{h6n}^2 + 2 \cdot m_{6n} \cdot Iu_{h6n} \cos(\theta - \chi_{6n})]^{1/2}/[Iu_1 \cdot \cos(\Phi_1)]$ $(m_{6n} = [Iu_{6n-1}^2 + Iu_{6n+1}^2 + 2 \cdot Iu_{6n-1} \cdot Iu_{6n+1} \cdot \cos(\Phi_{6n-1} - \Phi_{6n+1})]^{1/2})$, and a phase difference ($\Phi_{6n}$) of said AC component from the fundamental wave component of said second AC voltage takes an angle represented by $\tan^{-1}[\{m_{6n} \cdot \sin(\chi_{6n}) + Iu_{h6n} \cdot \sin(\chi_{6n})\}/\{m_{6n} \cdot \cos(\chi_{6n}) + Iu_{h6n} \cdot \cos(\chi_{6n})\}]$ $(\chi_{6n} = \tan^{-1}[\{Iu_{6n-1} \cdot \sin(\Phi_{6n-1}) + Iu_{6n+1} \cdot \sin(\Phi_{6n+1})\}/\{Iu_{6n-1} \cdot \cos(\Phi_{6n-1}) + Iu_{6n+1} \cdot \cos(\Phi_{6n+1})\}])$, with relationship of $Iu_{h6n} < m_{6n}$ and θ: arbitrary.

8. The power converter control method according to claim 7, wherein
the ratio of said AC component with respect to said DC component is calculated in advance as a function of a plurality of operation states of said load before said load is actually operated, and
said direct AC-AC power converter is controlled based on said function upon said actual operation.

9. The power converter control method according to claim 8, wherein said operation states include a plurality of power states consumed by said load, and
said ratio corresponding to said power states upon said actual operation is taken.

10. The power converter control method according to claim 7, wherein $Iu_{h6n}=0$ is true in all n.

11. The power converter control method according to claim 7, wherein an amplitude of said AC component is increased in a predetermined range of said base fundamental angular frequency of said second AC voltage according to a sensitization amount which increases when said base fundamental angular frequency increases.

12. The power converter control method according to claim 11, wherein $Iu_{h6n}=0$ is true in all n.

* * * * *